United States Patent
Suh et al.

(10) Patent No.: US 10,164,251 B2
(45) Date of Patent: Dec. 25, 2018

(54) NEGATIVE ACTIVE MATERIAL AND LITHIUM BATTERY INCLUDING NEGATIVE ACTIVE MATERIAL

(71) Applicant: SAMSUNG SDI CO., LTD., Yongin-si, Gyeonggi-do (KR)

(72) Inventors: Soonsung Suh, Yongin-si (KR); Jaehyuk Kim, Yongin-si (KR); Heeyoung Chu, Yongin-si (KR); Hana Yoo, Yongin-si (KR); Seunguk Kwon, Yongin-si (KR); Dukhyoung Yoon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 197 days.

(21) Appl. No.: 14/956,293

(22) Filed: Dec. 1, 2015

(65) Prior Publication Data

US 2016/0181598 A1  Jun. 23, 2016

(30) Foreign Application Priority Data

Dec. 23, 2014 (KR) .................. 10-2014-0186730
Mar. 20, 2015 (KR) .................. 10-2015-0039026

(51) Int. Cl.
*H01M 4/36* (2006.01)
*H01M 4/58* (2010.01)
(Continued)

(52) U.S. Cl.
CPC ............. *H01M 4/366* (2013.01); *B22F 1/025* (2013.01); *C22C 24/00* (2013.01); *H01M 4/362* (2013.01);
(Continued)

(58) Field of Classification Search
CPC ...... H01M 4/362; H01M 4/366; H01M 4/386; H01M 4/5825; H01M 2220/20; H01M 2220/30; H01M 10/0525
(Continued)

(56) References Cited

U.S. PATENT DOCUMENTS

| 6,265,111 B1 | 7/2001 | Bito et al. |
| 2005/0214646 A1 | 9/2005 | Kubota |

(Continued)

FOREIGN PATENT DOCUMENTS

| KR | 10-0790271 B1 | 1/2008 |
| KR | 10-0972187 B1 | 7/2010 |

(Continued)

OTHER PUBLICATIONS

Korean Patent Abstracts of 1020090078591 A, Jul. 20, 2009 for Korean Patent No. 10-0972187 B1, Jul. 26, 2010, 1 page.

(Continued)

*Primary Examiner* — Osei K Amponsah
(74) *Attorney, Agent, or Firm* — Lewis Roca Rothgerber Christie LLP

(57) ABSTRACT

A negative active material includes a silicon-based alloy, wherein the silicon-based alloy includes silicon (Si); a first metal ($M_1$) selected from titanium (Ti), vanadium (V), chromium (Cr), iron (Fe), cobalt (Co), nickel (Ni), copper (Cu), zinc (Zn), gallium (Ga), and germanium (Ge), and at least one additional element (A), which is included in the silicon-based alloy and on a surface of silicon-based alloy, selected from carbon (C), boron (B), sodium (Na), nitrogen (N), phosphorous (P), sulfur (S), and chlorine (Cl), and the silicon-based alloy has an internal porosity of about 35% or less. A lithium battery including the negative active material may have improved lifespan characteristics.

20 Claims, 15 Drawing Sheets
(1 of 15 Drawing Sheet(s) Filed in Color)

(51) Int. Cl.
*H01M 10/0525* (2010.01)
*H01M 4/38* (2006.01)
*C22C 24/00* (2006.01)
*B22F 1/02* (2006.01)
*C22C 21/00* (2006.01)

(52) U.S. Cl.
CPC ......... *H01M 4/386* (2013.01); *H01M 4/5825* (2013.01); *H01M 10/0525* (2013.01); *B22F 2999/00* (2013.01); *C22C 21/00* (2013.01); *H01M 2220/20* (2013.01); *H01M 2220/30* (2013.01); *Y02T 10/7011* (2013.01)

(58) Field of Classification Search
USPC .......................................... 429/218.1–231.9
See application file for complete search history.

(56) References Cited

U.S. PATENT DOCUMENTS

| | | |
|---|---|---|
| 2006/0102472 A1 | 5/2006 | Bito et al. |
| 2008/0206631 A1 | 8/2008 | Christensen et al. |
| 2013/0189575 A1 | 7/2013 | Anguchamy et al. |
| 2013/0196158 A1* | 8/2013 | Yoshida ................ H01M 4/364 428/402 |
| 2014/0234721 A1 | 8/2014 | Yang et al. |
| 2016/0013517 A1 | 1/2016 | Nakazawa et al. |

FOREIGN PATENT DOCUMENTS

| | | |
|---|---|---|
| KR | 10-1063239 B1 | 9/2011 |
| KR | 10-1186713 B1 | 9/2012 |
| WO | WO 2012/036265 A1 | 3/2012 |
| WO | WO 2013/146658 A1 | 10/2013 |
| WO | WO 2014/157591 A1 | 10/2014 |

OTHER PUBLICATIONS

Korean Patent Abstracts of 1020100060613 A, Jun. 7, 2010 for Korean Patent No. 10-1063239 B1, Sep. 7, 2011, 1 page.
EPO Search Report dated Apr. 26, 2016, for corresponding European Patent application 15202643.1, (8 pages).
English machine translation of International Publication WO 2013/146658 published Oct. 3, 2013, listed above, (15 pages).
EPO Office Action dated Jul. 30, 2018, for corresponding European Patent Application No. 15202643.1 (5 pages).

* cited by examiner

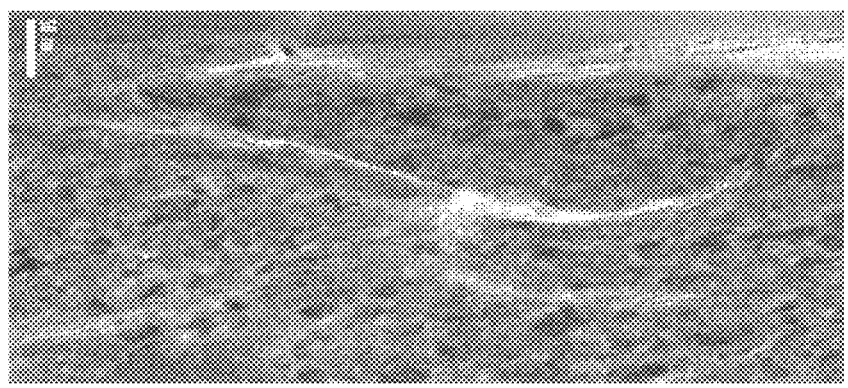
FIG. 8A
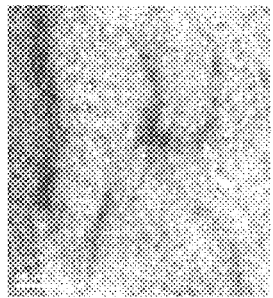 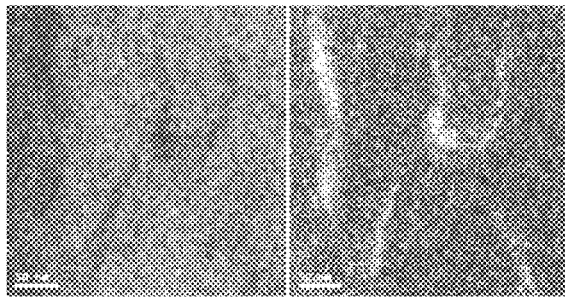
FIG. 8B    FIG. 8C    FIG. 8D

NEGATIVE ACTIVE MATERIAL AND LITHIUM BATTERY INCLUDING NEGATIVE ACTIVE MATERIAL

CROSS-REFERENCE TO RELATED APPLICATION

This application claims priority to and the benefit of Korean Patent Application No. 10-2014-0186730, filed on Dec. 23, 2014, in the Korean Intellectual Property Office and Korean Patent Application No. 10-2015-0039026, filed on Mar. 20, 2015, in the Korean Intellectual Property Office, the entire content of each of which is incorporated herein by reference.

BACKGROUND

1. Field

One or more example embodiments relate to a negative active material and a lithium battery including the negative active material.

2. Description of the Related Art

Recently, lithium secondary batteries for personal digital assistants (PDAs), mobile phones, or laptop computers for information communication, portable electronic devices, or electric bicycles have two or more times of discharging voltage than other kinds of batteries, which provides a high energy density.

Lithium secondary batteries produce electrical energy by way of oxidization or reduction reactions which occur during intercalation and deintercalation of lithium ions. In lithium secondary batteries an organic electrolyte or a polymer electrolyte is injected between a positive electrode, which includes an active material capable of intercalation and deintercalation of lithium ions, and a negative electrode.

SUMMARY

One or more example embodiments include a negative active material including alloy having an internal porosity of about 35% or less.

One or more example embodiments include a lithium battery using the negative active material.

Additional aspects will be set forth in part in the description which follows and, in part, will be apparent from the description, or may be learned by practice of the presented embodiments.

According to one or more example embodiments, a negative active material includes a silicon-based alloy, wherein the silicon-based alloy includes silicon (Si); a first metal ($M_1$); and an additional element (A); the first metal ($M_1$) is selected from titanium (Ti), vanadium (V), chromium (Cr), iron (Fe), cobalt (Co), nickel (Ni), copper (Cu), zinc (Zn), gallium (Ga), and germanium (Ge); the additional element (A) is at least one selected from carbon (C), boron (B), sodium (Na), nitrogen (N), phosphorous (P), sulfur (S), and chlorine (Cl); the additional element (A) is included in the silicon-based alloy and disposed on surfaces of the silicon-based alloy; and an internal porosity of the silicon-based alloy is 35% or less, wherein the porosity is determined by Mathematical Equation 1:

Mathematical Equation 1

$$\text{Internal porosity of the silicon-based alloy (\%)} = \left[1 - \frac{\text{density of the alloy measured under a pressure of 20 kN}}{\text{true density of the alloy}}\right] \times 100.$$

In one embodiment, The silicon-based alloy may include a matrix including the Si and the first metal ($M_1$); silicon nanoparticles; and the additional element (A), wherein the silicon nanoparticles are dispersed in the matrix, and the additional element (A) is included in the matrix and disposed on a surface of the silicon-based alloy.

In one embodiment, the matrix may include a compound phase including or consisting of Si and the first metal ($M_1$) and the silicon nanoparticles may include a single phase of Si.

In one embodiment, at least one portion of the additional element (A) included in the matrix is in the form of a silicide.

In one embodiment, the first metal ($M_1$) may be Fe.

In one embodiment, the silicon-based alloy may further include an oxygen (O) atom.

In one embodiment, the silicon-based alloy may include a matrix containing Si, the first metal ($M_1$), and the O atom; silicon nanoparticles; and the additional element (A), where the silicon nanoparticles are dispersed in the matrix, and the additional element (A) is included in the matrix and disposed on a surface of the silicon-based alloy.

In one embodiment, the matrix may include a compound phase including or consisting of Si and the first metal ($M_1$) and a compound phase including or consisting of Si and the O atom, and the silicon nanoparticles may include a single phase of Si.

In one embodiment, the matrix may further include a compound phase including or consisting of the first metal ($M_1$) and the O atom.

In one embodiment, the silicon-based powder alloy may further include a second metal ($M_2$) selected from manganese (Mn), yttrium (Y), zirconium (Zr), niobium (Nb), molybdenum (Mo), silver (Ag), tin (Sn), tantalum (Ta), and tungsten (W).

In one embodiment, the silicon-based alloy may be represented by Si-$M_1$-$M_2$-A, and the second metal ($M_2$) may be selected from Mn, Y, Zr, Nb, Mo, Ag, Sn, Ta, and W, wherein in the silicon-based alloy, an amount of Si may be in a range of about 50 atom % to about 90 atom %, an amount of the first metal ($M_1$) may be in a range of about 10 atom % to about 50 atom %, and an amount of $M_2$ may be in a range of about 0 atom % to about 10 atom %, based on a total number of atoms of Si, the first metal ($M_1$), and the second metal ($M_2$), and a total amount of the additional element (A) may be in a range of about 0.01 part by weight to about 20 parts by weight, based on 100 parts by weight of a total amount of the Si, the first metal ($M_1$), and the second metal ($M_2$), wherein, the total amount of the additional element (A) may be a sum of an amount of the additional element (A) included in the silicon-based alloy and an amount of the additional element (A) disposed on the surfaces of the silicon-based alloy.

In one embodiment, the total amount of the additional element (A) may be in a range of about 1 part by weight to about 9 parts by weight, based on 100 parts by weight of the total amount of the Si, the first metal ($M_1$), and the second metal ($M_2$).

In one embodiment, the amount of the additional element (A) disposed on the surfaces of the silicon-based alloy may be equal to or more than the amount of the additional element (A) included in the silicon-based alloy.

In one embodiment, the amount of the additional element (A) included in the silicon-based alloy may be in a range of about 0.1 part by weight to about 4 parts by weight, based on 100 parts by weight of the total amount of the Si, the first metal ($M_1$), and the second metal ($M_2$), and the amount of the additional element (A) disposed on the surfaces of the silicon-based alloy may be in a range of about 0.5 part by weight to about 7 parts by weight, based on 100 parts by weight of the total amount of the Si, the first metal ($M_1$), and the second metal ($M_2$).

In one embodiment, the silicon-based alloy may be represented by $Si-M_1-M_2-A-O$, and the second metal ($M_2$) may be selected from Mn, Y, Zr, Nb, Mo, Ag, Sn, Ta, and W, wherein in the silicon-based alloy, an amount of Si may be in a range of about 50 atom % to about 90 atom %, an amount of the first metal ($M_1$) may be in a range of about 10 atom % to about 50 atom %, and an amount of the second metal ($M_2$) may be in a range of about 0 atom % to about 10 atom %, based on a total number of atoms of the Si, the first metal ($M_1$), and the second metal ($M_2$), and a total amount of the additional element (A) may be in a range of about 0.01 part by weight to about 20 parts by weight, an amount of O may be in a range of about 0.01 part by weight to 50 parts by weight, based on 100 parts by weight of a total weight of the Si, the first metal ($M_1$), and the second metal ($M_2$).

In one embodiment, the silicon-based alloy includes a matrix containing Si, the first metal ($M_1$), the second metal ($M_2$), and O; silicon nanoparticles; and the additional element (A), wherein the silicon nanoparticles are dispersed in the matrix, the additional element (A) is comprised in the matrix and disposed on a surface of the silicon-based alloy, the matrix may include a compound phase including or consisting of Si and the first metal ($M_1$), a compound phase including or consisting of Si and the second metal ($M_2$), and a compound phase including or consisting of Si and O, and the silicon nanoparticles may include a single phase of Si.

In one embodiment, the silicon-based alloy may be represented by $Si-M_1-M_2-C-B-O$, and the second metal ($M_2$) may be selected from Mn, Y, Zr, Nb, Mo, Ag, Sn, Ta, and W, wherein in the silicon-based alloy, an amount of Si is in a range of about 50 atom % to about 90 atom %, an amount of the first metal ($M_1$) is in a range of about 10 atom % to about 50 atom %, and an amount of the second metal ($M_2$) is in a range of about 0 atom % to about 10 atom %, based on a total number of atoms of Si, the first metal ($M_1$), and the second metal ($M_2$), and a total amount of C is in a range of about 0.01 part by weight to about 20 parts by weight, a total amount of B is in a range of about 0 part by weight to about 20 parts by weight, and an amount of O is in a range of about 0.01 part by weight to about 50 parts by weight, based on 100 parts by weight of a total weight of Si, the first metal ($M_1$), and the second metal ($M_2$).

In one embodiment, an average particle diameter (D50) of the silicon-based alloy may be in a range of about 1 μm to about 5 μm.

In one embodiment, the silicon-based alloy may include silicon nanoparticles, and a D50 of the silicon nanoparticles may be in a range of about 10 nm to about 150 nm.

In one embodiment, a lithium battery may include the negative active material.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects will become apparent and more readily appreciated from the following description of the example embodiments, taken in conjunction with the accompanying drawings in which:

FIGS. 8A-8D are transmission electron microscope (TEM) images (at a magnification of 130,000 times) of a cross section of the alloy prepared in Example 1;

DETAILED DESCRIPTION

Figure 1:
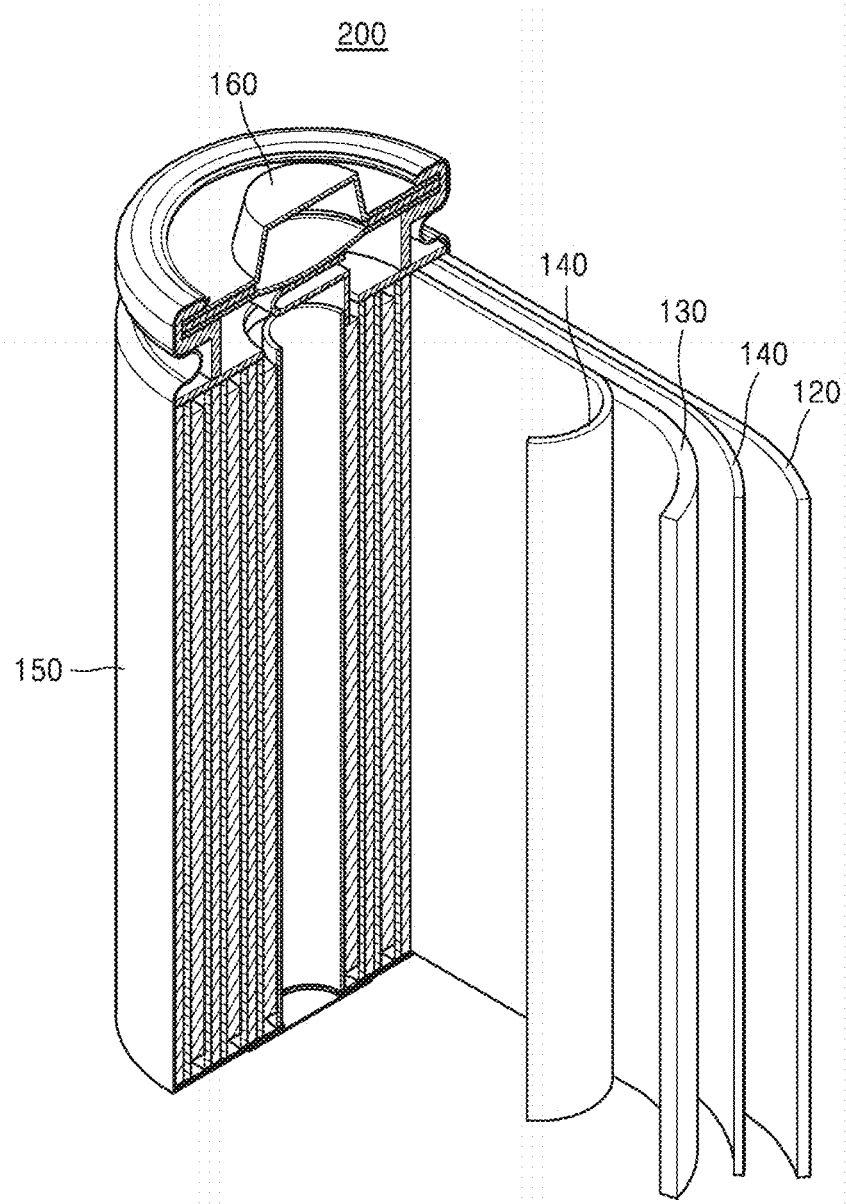
FIG. 1 is a schematic view illustrating a structure of a lithium battery according to an example embodiment.

Reference will now be made in detail to example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present description. As used herein, the term "and/or" includes any and all combinations of one or more of the associated listed items.

As used herein, the term "substantially," "about," and similar terms are used as terms of approximation and not as terms of degree, and are intended to account for the inherent deviations in measured or calculated values that would be recognized by those of ordinary skill in the art. Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a), and 35 U.S.C. § 132(a).

Hereinafter, embodiments of the inventive concept will be described in detail. In embodiments, atom % (at %) indicates a percentage of the number of atoms of a corresponding component based on the total number of atoms constituting a material.

A negative active material according to an example embodiment may include:
 a silicon-based alloy,
 wherein the silicon-based alloy may include:
  silicon (Si); a first metal ($M_1$); and an additional element (A);
  wherein, the first metal ($M_1$) may be selected from titanium (Ti), vanadium (V), chromium (Cr), iron (Fe), cobalt (Co), nickel (Ni), copper (Cu), zinc (Zn), gallium (Ga), and germanium (Ge);
  the additional element (A) may include at least one selected from carbon (C), boron (B), sodium (Na), nitrogen (N), phosphorous (P), sulfur (S), and chlorine (Cl);
  the additional element (A) may be disposed in and on a surface of the silicon-based alloy (e.g., the additional element A may be present in the primary particles or the secondary particles formed by aggregation of the primary particles of the silicon-based alloy as well as being present on the surface of the silicon-based alloy); and
  an internal porosity of the silicon-based alloy may be 35% or less.

As used herein, the term "silicon-based" alloy refers to an alloy that includes at least about 50 atom % Si, based on the total number of atoms in the alloy. The negative active material may include the silicon-based alloy, realizing a battery with high capacity as compared to a battery including a carbonaceous negative active material.

However, during the charging and discharging of a lithium secondary battery, the volume of Si may swell and shrink due to intercalation/deintercalation of lithium ions. As volume changes repeatedly occur during charging and discharging, the surface of the negative active material may be cracked, and such cracks may result in reduced cycle characteristics of the lithium battery.

In addition, when it comes to alloys formed by alloying Si and various types or kinds of metals, the alloy may have a pore thereinside. When the proportion of the pore inside the alloy is high (e.g., the alloy has a high porosity), a side reaction of Si and/or metal and electrolyte may occur, thereby forming an irreversible side-product during charging and discharging. Due to such a side-product, cycle characteristics of the lithium secondary battery may decrease.

In order to resolve the above described problem, silicon-based alloy including the additional element (A) both inside and on an outer surface of the silicon-based alloy, having a porosity of about 35% or less inside the silicon-based alloy is described herein. On the other hand, a silicon-based alloy not including the additional element (A) may have an internal porosity of about 35% or more.

The additional element (A) included in the silicon-based alloy may serve as a buffer layer that buffers volume changes of Si and reduces the internal porosity of the silicon-based alloy. For example, the additional element (A) is included in the silicon-based alloy, and thus, volume expansion of Si may be suppressed or reduced, and sites of side-reaction with electrolyte may decrease while charging the lithium battery. In addition, the additional element (A) disposed on the outer surface of the silicon-based alloy may serve as a double buffer layer with respect to volume expansion of Si, and reduce consumption of lithium that would otherwise result due to the additional side reaction with electrolyte.

Therefore, when the additional element (A) is included both in the silicon-based alloy (e.g., in the primary particles or the secondary particles formed by aggregation of the primary particles of the silicon-based alloy) and on a surface of the silicon-based alloy, capacity and lifespan characteristics of the lithium battery may improve.

In the present specification, an "internal porosity of the silicon-based alloy" may be determined by Mathematical Equation 1:

Mathematical Equation 1

$$\text{Internal porosity of the silicon-based alloy } (\%) = \left[1 - \frac{\text{density of the alloy measured under a pressure of 20 kN}}{\text{true density of the alloy}}\right] \times 100.$$

The internal porosity of the silicon-based alloy, as determined by Mathematical Equation 1, is distinct with respect to porosity among alloys or total porosity (a ratio of the sum of the pores inside the alloys and the pores among the alloys of the total volume of the alloys). The internal porosity of the alloy only takes into consideration pores present inside the alloy. For example, the internal porosity only accounts for the pores at the interior of the alloy and not the pores between the alloys.

In Mathematical Equation 1, a "density of the alloy measured under a pressure of about 20 kN (g/cc)" corresponds to a value obtained by dividing (a fixed amount of the alloy) by (a volume that the alloy occupies when a pressure of 20 kN is applied thereto). The density may be measured using a conductivity measurement system. Here, the measured density value may be smaller than the actual density of alloy since the measured density value is calculated in a way that the volume of the alloy also includes the volume of the pores inside the alloy at a pressure of 20 kN.

In Mathematical Equation 1, a "true density of the alloy (g/cc)" corresponds to a value obtained by dividing (a fixed amount of the alloy) by (a volume that the alloy occupies, excluding the volume of the pores inside the alloy). The true density may be measured using a gas pycnometer.

In some embodiments, the internal porosity of the silicon-based alloy may be in a range of about 20% to about 35%. In some embodiments, the internal porosity of the silicon-based alloy may be in a range of about 20% to about 32%. For example, the internal porosity of the silicon-based alloy may be in a range of about 20% to about 30%, or in a range of about 24% to about 30%. Within the above described ranges, a side reaction of the silicon-based alloy and electrolyte may be suppressed or reduced. Further, initial efficiency of a battery may not be reduced due to a decrease of permeability of electrolyte.

Here, an internal porosity of the silicon-based alloy may be adjusted by varying the amount of the additional element (A). Also, even when the same or substantially the same amount of the additional element (A) is used, the internal porosity of silicon-based alloy may be adjusted by adjusting the amount of the additional element (A) inside the silicon-based alloy. In some embodiments, when the amount of the additional element (A) included in the silicon-based alloy increases, the internal porosity of the alloy may decrease. On the other hand, when the amount of the additional element (A) included in the silicon-based alloy decreases, the internal porosity of the alloy may increase. The amount of the additional element (A) inside the silicon-based alloy may be adjusted by varying the injection point of raw materials including the additional element (A) or by varying the processing time during the manufacturing process of the alloy.

In some embodiments, the first metal ($M_1$) may be selected from Fe, Al, and Cu. In some embodiments, the first metal ($M_1$) may be Fe. When the first metal ($M_1$) is Fe, volume expansion of Si may be effectively suppressed or reduced.

In some embodiments, the silicon-based alloy may have a structure that includes a matrix including Si and the first metal ($M_1$); silicon nanoparticles dispersed in the matrix; and the additional element (A) included in the matrix and disposed on a surface of the silicon-based alloy.

The matrix including Si and the first metal ($M_1$) is an inert matrix incapable of intercalation/deintercalation of lithium ions during the charging and discharging of a lithium battery. The matrix may suppress or reduce volume expansion of silicon-based alloy.

In some embodiments, the matrix may include a compound phase including or consisting of Si and the first metal ($M_1$) incapable of intercalation/deintercalation of lithium ions during the charging and discharging of a lithium battery. In some embodiments, the compound phase including or consisting of Si and the first metal ($M_1$) may include a silicide of the first metal ($M_1$).

In some embodiments, when the first metal ($M_1$) is Fe, the compound phase including or consisting of Si and Fe may include a FeSi phase, a $FeSi_2$ phase, or a $Fe_2Si_5$ phase.

In some embodiments, when the first metal ($M_1$) is Fe, the compound phase including or consisting of Si and the first metal ($M_1$) may include a $FeSi_2$ phase, for example, a $FeSi_2$ beta phase or a $Fe_2Si_5$ alpha phase. For example, the compound phase including or consisting of Si and the first metal ($M_1$) may include a $Fe_2Si_5$ alpha phase. The $FeSi_2$ phase may show a peak corresponding to a crystal plane (102) at a diffraction angle (2θ) of 49.1+/-0.5 degree (°), a peak corresponding to a crystal plane (101) at a diffraction angle (2θ) of 38.0+/-0.5°, and/or a peak corresponding to a crystal plane (001) at a diffraction angle (2θ) of 17.3+/-0.5° in the X-ray diffraction (XRD) analysis spectrum using Cu-Kα radiation. When the $FeSi_2$ phase is included in the matrix of the alloy, volume expansion of silicon nanoparticles in the lithium battery during charging and discharging the lithium battery is reduced, thereby improving lifespan characteristics of the lithium battery.

When the first metal ($M_1$) is Al, the compound phase including or consisting of Si and the first metal ($M_1$) may include an $Al_3Si_3$ phase.

When the first metal ($M_1$) is Cu, the compound phase including or consisting of Si and the first metal ($M_1$) may include a $Cu_3Si$ phase. In some embodiments, when the first metal ($M_1$) is Cu, the compound phase including or consisting of Si and the first metal ($M_1$) may be a $Cu_3Si$ phase.

In some embodiments, the silicon nanoparticles may include a single phase of the Si. For example, in some embodiments the single phase of Si consists of Si only, and the single phase may include active Si capable of a reversible reaction with lithium ions, which determines the capacity of the silicon-based alloy.

The single phase of Si may show a peak corresponding to a crystal plane (111) at a diffraction angle (2θ) of 28.5+/-0.5° in an XRD analysis spectrum using Cu-Kα radiation.

Here, the additional element (A) may be continuously disposed or discontinuously disposed in an island type or kind on a surface of the alloy (e.g., the additional element may be included in a continuous coating on the surface of the alloy or the additional element may be included in a discontinuous coating including discrete "islands"). As used herein, the term "island"-type or kind refers to a coating having a spherical, hemispherical, non-spherical, or irregular shape, each with a predetermined (or set) volume, but the shape is not particularly limited thereto. The additional element (A) disposed on a surface of the alloy may not be bound to any other material.

The additional element (A) disposed in the alloy may present inside the matrix. For example, the additional element (A) included in the alloy may be present between the matrix and the silicon nanoparticles. In some embodiments, the additional element (A) may be included in a pore that would otherwise exist when there is no additional element (A), thereby decreasing the amount of pores inside the matrix in the alloy. Accordingly, the internal porosity of the silicon-based alloy may be adjusted to 35% or less by adding the additional element (A) thereto.

In some embodiments, at least one portion of the additional element (A) included in the alloy may be in a form of a silicide, for example, in a form of a compound including or consisting of the additional element (A) and Si. In some embodiments, the additional element (A) may form the silicide by reacting with Si during the preparation of alloy. The formed silicide may be included inside a matrix.

In some embodiments, the additional element (A) may be boron and/or carbon.

In some embodiments, when the additional element (A) is boron, at least one portion of boron in the alloy may be in a form of a silicide, such as $SiB_4$ or $SiB_6$, and the remaining boron may exist as B (e.g., elemental boron).

In some embodiments, when the additional element (A) is carbon, at least one portion of carbon inside the alloy may be in a form of a silicide, such as SiC, and the rest may exist as C (e.g., elemental carbon). Here, the remaining C may be amorphous carbon.

C may have a Mohs hardness in a range of about 1 to about 2, which is lower than those of Si (in a range of about 6 to about 7) and Fe (about 4), and thus, the pores inside the silicon-based alloy may be effectively filled when preparing the silicon-based alloy. Further, C that is present on a surface of the alloy may contribute to improvement of conductivity of a negative electrode.

In some embodiments, the silicon-based alloy may further include an O atom. In some embodiments, the O atom may form a matrix together with Si and the first metal ($M_1$). For example, when the silicon-based alloy includes an O atom, a matrix of the silicon-based alloy may further include a compound phase including or consisting of Si and an O atom. The compound phase including or consisting of Si and an O atom may be an oxide phase of $SiO_2$ or the like.

In some embodiments, a compound phase including or consisting of Si and an O atom may be present at an interface of the compound phase including or consisting of Si and the first metal ($M_1$) and silicon nanoparticles, thereby increasing the density of the matrix so as to decrease the porosity thereof.

In some embodiments, when the silicon-based alloy further includes an O atom, the matrix of the silicon-based alloy may include the compound phase including or consisting of the first metal ($M_1$) and an O atom in addition to the compound phase including or consisting of Si and an O atom. In some embodiments, the compound phase including or consisting of the first metal ($M_1$) and the O atom may be an oxide. In the presence of the compound phase including or consisting of the first metal ($M_1$) and the O atom, the compound phase may have the same or substantially the same role as the compound phase including or consisting of Si and an O atom.

In some embodiments, the silicon-based alloy may further include a second metal ($M_2$), and the second metal ($M_2$) may be selected from manganese (Mn), yttrium (Y), zirconium (Zr), niobium (Nb), molybdenum (Mo), silver (Ag), tin (Sn), tantalum (Ta), and tungsten (W).

When the silicon-based alloy further includes the second metal ($M_2$), the matrix may further include a compound phase including or consisting of Si and the second metal ($M_2$). The compound phase including or consisting of Si and the second metal ($M_2$) may contribute to effective buffering of volume expansion of silicon nanoparticles.

In some embodiments, the silicon-based alloy may be represented by $Si\text{-}M_1\text{-}M_2\text{-}A$.

In the silicon-based alloy, the amount of Si may be in a range of about 50 atom % to about 90 atom %, for example, about 70 atom % to about 90 atom %, and the amount of the first metal ($M_1$) may be in a range of about 10 atom % to about 50 atom %, for example, about 10 atom % to about 30 atom %, based on the total number of atoms of the Si, the first metal ($M_1$), and the second metal ($M_2$). Within these ranges, a suitable or desired level of discharging capacity and lifespan characteristics may be obtained.

In the silicon-based alloy, the amount of the second metal ($M_2$) may be in a range of about 0 atom % to about 10 atom %, for example, about 0 atom % to about 5 atom %, based on the total number of atoms of the Si, the first metal ($M_1$), and the second metal ($M_2$).

The total amount of the additional element (A) disposed in the silicon-based alloy may be in a range of about 0.01 part by weight to about 20 parts by weight, based on 100 parts by weight of the total amount of the Si, the first metal ($M_1$), and the second metal ($M_2$). Here, the total amount of the additional element (A) may be a sum of an amount of the additional element (A) included in the silicon-based alloy and an amount of the additional element (A) disposed on the surface thereof. Within this range, the porosity inside the alloy may be adjusted to 35% or less, thereby improving lifespan characteristics of a lithium battery. In some embodiments, the total amount of the additional element (A) disposed in the silicon-based alloy may be in a range of about 1 part by weight to 9 parts by weight, for example, about 2 parts by weight to about 9 parts by weight, based on 100 parts by weight of the total amount of the Si, $M_1$, and the second metal ($M_2$).

In some embodiments, the amount of the additional element (A) included in the silicon-based alloy (e.g., in the primary particles or the secondary particles formed by aggregation of the primary particles of the silicon-based alloy) may be in a range of about 0.1 part by weight to about 4 parts by weight, and the amount of the additional element (A) on a surface of the silicon-based alloy surface may be in a range of about 0.5 part by weight to about 7 parts by weight, based on 100 parts by weight of the total amount of the Si, the first metal ($M_1$), and the second metal ($M_2$). Within these ranges, discharging capacity and lifespan characteristics of a lithium battery may improve.

The amount of the additional element (A) included in the silicon-based alloy and the amount of the additional element (A) disposed on a surface of the silicon-based alloy may be measured using a thermogravimetric analyzer (TGA). For example, when heating a certain amount of the silicon-based alloy at a temperature of about 400° C. to about 500° C., the additional element (A) on a surface of the silicon-based alloy surface may be oxidized with oxygen in the air. Thus, the weight of the additional element (A) with respect to the initial weight thereof may decrease corresponding to an amount of the additional element (A) disposed on the surface of particles of the silicon-based alloy. Therefore, the amount of the additional element (A) disposed on the surface of particles of the silicon-based alloy corresponds to the decreased weight from the initial weight of the silicon-based alloy. The amount of the additional element (A) included in the silicon-based alloy may be determined by deducting the amount of the additional element (A) disposed on the surface of the silicon-based alloy from the total amount of the additional element (A) (e.g., based on an input of the additional element (A) when preparing the silicon-based alloy).

In some embodiments, the silicon-based alloy may be represented by $Si\text{-}M_1\text{-}M_2\text{-}A\text{-}O$.

The silicon-based alloy represented by $Si\text{-}M_1\text{-}M_2\text{-}A\text{-}O$ may have an amount of the Si, the first metal ($M_1$), the second metal ($M_2$), and the additional element (A) as described above.

In some embodiments, the amount of O atom may be in a range of about 0.01 part by weight to 50 parts by weight, based on 100 parts by weight of the total amount of the Si, the first metal ($M_1$), and the second metal ($M_2$). Within this range, the O atom may be in a form of a compound with Si and/or metal, thereby reducing an internal porosity, while not reducing a capacity of alloy.

In some embodiments, the silicon-based alloy may be represented by $Si\text{-}M_1\text{-}M_2\text{-}C\text{—}B\text{—}O$.

The silicon-based alloy represented by $Si\text{-}M_1\text{-}M_2\text{-}C\text{—}B\text{—}O$ may have an amount of the Si, the first metal ($M_1$), the second metal ($M_2$), and the O atom as described above.

In some embodiments, the total amount of C may be in a range of about 0.01 part by weight to 20 parts by weight, and the total amount of B may be in a range of about 0 parts by weight to about 20 parts by weight, based on 100 parts by weight of the total amount of the Si, the first metal ($M_1$), and the second metal ($M_2$). Here, the total amount of C and the total amount of B each indicate a total amount of C and B included in the silicon-based alloy and disposed on a surface of the silicon-based alloy, respectively. Within these ranges, the porosity inside the silicon-based alloy may be adjusted to 35% or less.

In some embodiments, the total amount of C may be in a range of about 0.1 part by weight to about 10 parts by weight, for example, about 1 part by weight to about 9 parts by weight, for example, about 2 parts by weight to about 9 parts by weight, based on 100 parts by weight of the total amount of the Si, the first metal ($M_1$), and the second metal ($M_2$).

In some embodiments, the total amount of B may be in a range of about 0 part by weight to about 10 parts by weight, for example, about 0 part by weight to about 5 parts by weight, for example, about 0.1 part by weight to about 5 parts by weight, based on 100 parts by weight of the total amount of the Si, the first metal ($M_1$), and the second metal ($M_2$).

In some embodiments, an average particle diameter (D50) of the silicon-based alloy may be in a range of about 1 μm to about 5 μm. In some embodiments, a D50 of the silicon-based alloy may be in a range of about 1 μm to about 3 μm. For example, in some embodiments, a D50 of the silicon-based alloy may be in a range of about 2 μm to about 3 μm.

The term average particle diameter as used herein means a particle size corresponding to 50% in an accumulated particle size distribution curve, a D50, when the total number of particles is 100% in the accumulated particle size distribution curve in which particles are sequentially accumulated in the order of a particle having the smallest size to a particle having the largest size. The D50 may be measured by using any suitable method available in the art such as, for example, a method using a particle size analyzer, or transmission electron microscopy (TEM) or scanning electron microscopy (SEM). Alternatively, for example, after a measurement apparatus using dynamic light-scattering is used, data analysis is performed to count the number of particles of lithium cobalt oxide for each of the size ranges, which will provide the D50 values.

In some embodiments, a D50 of the silicon nanoparticles may be in a range of about 10 nm to about 150 nm. In some embodiments, a D50 of the silicon nanoparticles may be in a range of about 10 nm to about 100 nm, or about 10 nm to about 50 nm.

The active silicon nanoparticles, whose particle sizes are within the above ranges, may be dispersed uniformly throughout the inert matrix. Thus, volume expansion of active silicon nanoparticles may be effectively prevented or reduced during charging and discharging cycles by the inert matrix surrounding the active silicon nanoparticles.

The D50 of silicon nanoparticles may be obtained by Scherrer's equation using a full width at half maximum (FWHM) of a peak corresponding to a crystal plane (111) at a diffraction angle (2θ) of 28.5+/−0.5° in an XRD analysis spectrum using Cu-Kα radiation having a single phase.

In some embodiments, a negative active material includes the silicon-based alloy as an essential component and may further include any suitable material for the negative active material which is generally available in the art of lithium batteries, in addition to the essential component.

Examples of the material for the negative active material may include a carbonaceous material such as graphite and carbon, a lithium metal and lithium alloys, a silicon oxide-based material, or any mixture thereof which are capable of intercalation and deintercalation of lithium ions.

In some embodiments, the silicon-based alloy and a carbonaceous material may be used as the negative active material, and the carbonaceous material may be natural graphite, artificial graphite, expanded graphite, graphene, carbon black, fullerene soot, carbon nanotubes, carbon fiber, soft carbon, hard carbon, pitch carbides, mesophase pitch carbides, sintered cokes or a combination of at least two thereof.

As such, when the carbonaceous material and the silicon-based alloy are used together, an oxidation reaction of the silicon-based alloy is inhibited, and a solid electrolyte interphase (SEI) layer may be efficiently formed, so that a stable layer is formed. The electrical conductivity may also increase. Thus, charging and discharging characteristics of a lithium battery including the negative active material may further be improved.

When the carbonaceous material is used, the carbonaceous material may be mixed or blended with the silicon-based alloy, or may be coated on the surface of the silicon-based alloy.

The amount of the material for the negative active material used together with the silicon-based alloy may be in the range of about 1 wt % to about 99 wt % based on the total amount of the material for the negative active material and the silicon-based alloy.

In some embodiments, when the silicon-based alloy is a major component in the negative active material, the content of the silicon-based alloy may be, for example, in a range of about 95 wt % to about 99 wt % based on the total amount of the material for the negative active material and the silicon-based alloy. If graphite or pitch, as amorphous carbon, is used as the material for the negative active material, graphite or pitch may be coated on the surface of the silicon-based alloy.

In some embodiments, when the silicon-based alloy is a minor component in the negative active material, the content of the silicon-based alloy may be, for example, in a range of about 1 wt % to about 5 wt % based on the total amount of the material for the negative active material and the silicon-based alloy. If graphite or pitch, as amorphous carbon, is used as the material for the negative active material, graphite or pitch may function as a buffer for the silicon-based alloy, so that the lifespan of the electrode may be increased.

Hereinafter, embodiments of a method of manufacturing a negative active material including a silicon-based alloy will be described.

In some embodiments, a method of preparing the negative active material may include: preparing a mother alloy having a composition of Si in a range of about 50 atom % to about 90 atom %, the first metal ($M_1$) in a range of about 10 atom % to about 50 atom %, and optionally, the second metal ($M_2$) in a range of about 0 atom % to about 10 atom %; rapidly solidifying melts of the mother alloy to obtain a rapidly solidified alloy; and preparing the silicon-based alloy by pulverizing the rapidly solidified alloy; wherein a material containing at least one additional element (A) selected from carbon (C), boron (B), sodium (Na), nitrogen (N), phosphorous (P), sulfur (S), and chlorine (Cl) may be added thereto during the preparing of the mother alloy and/or the preparing of the silicon-based alloy by pulverizing the rapidly solidified alloy such that the amount of A included in the prepared silicon-based alloy and disposed on a surface of the prepared silicon-based alloy may be in a range of about 0.01 part by weight to about 20 parts by weight, based on 100 parts by weight of the total amount of the Si, the first metal ($M_1$), and the second metal ($M_2$).

In some embodiments, the material containing A may be added thereto during the preparing of the silicon-based alloy by pulverizing the rapidly solidified alloy.

By varying the addition point of the material containing the additional element (A), the amount of the additional element (A) included in the silicon-based alloy may be adjusted. In some embodiments, the material containing the additional element (A) may be added thereto during the pulverization of the rapidly solidified alloy so that the additional element (A) may be disposed on a surface of the silicon-based alloy rather than the inside thereof. In some embodiments, the material containing the additional element (A) may be added thereto after half of the whole period of the pulverization of the rapidly solidified alloy is passed. For example, in some embodiments, the material containing A may be added thereto after ¾ of the whole period of the pulverization of the rapidly solidified alloy is passed. By using the method above, a silicon-based alloy, in which the amount of the additional element (A) disposed on the surface of the silicon-based alloy is equal to or more than the amount of the additional element (A) included in the silicon-based alloy (e.g., included in the primary particles or the secondary particles formed by aggregation of the primary particles of the silicon-based alloy), may be prepared. For example, a silicon-based alloy may be prepared in which the amount of the additional element (A) disposed on the surface of the silicon-based alloy is about two to about four times greater than the amount of the additional element (A) included in the silicon-based alloy (e.g., included in the primary particles or the secondary particles formed by aggregation of the primary particles of the silicon-based alloy).

In some embodiments, when the additional element (A) is boron (B), a material containing A-to-be-added may be boric acid. For example, in some embodiments, the boric acid may have a layer structure. Alternatively, a material containing A-to-be-added may be selected from $M_2B$ (wherein, M=Ta, Mo, W, Mn, Fe, Co, or Ni) compound and $M_3B_4$ (wherein, M=Nb, Ta, Cr, or Mn) compound.

In some embodiments, when the additional element (A) is carbon, a material containing A-to-be-added may be crystalline carbon, amorphous carbon, or a combination thereof. In some embodiments, the crystalline carbon may be at least one selected from shapeless, disk-shaped, flake, globular, or fibrous natural graphite, artificial graphite, carbon black, carbon whisker, and pitch-based carbon fiber. The amorphous carbon may be at least one selected from soft carbon and hard carbon. For example, in some embodiments, when the additional element (A) is carbon, a material containing A-to-be-added may be natural flake graphite or artificial flake graphite.

In order for the silicon-based alloy to further include an oxygen (O) atom, an oxygen atom containing material may be added thereto in the preparing of the mother alloy and/or the preparing silicon-based alloy by pulverizing the rapidly solidified alloy. Examples of the oxygen atom containing material include $Fe_2O_3$, $SiO_2$, and SiO, but embodiments are not limited thereto. Alternatively, the prepared silicon-based alloy may include more oxygen atoms due to an inclusion of oxygen gas in the air during the process. Alternatively, by performing the process under an oxygen atmosphere, the prepared silicon-based alloy may include more oxygen atoms.

The preparing of the mother alloy may be performed by vacuum induction melting (VIM), arc melting, or mechanical alloying. For example, the mother alloy may be prepared using VIM by which the mother alloy is melted in a vacuum in order to inhibit oxidation caused by exposure to air as much as possible. However, the method of preparing the mother alloy is not limited thereto, and any suitable method of preparing a mother alloy generally available in the art may also be used.

Raw materials used to form the silicon-based alloy are not limited as long as a suitable or desired composition ratio thereof is obtainable. For example, in order to mix elements used to form the silicon-based alloy at a suitable or desired composition ratio, elements, alloys, solid solutions, or intermetallic compounds may be used.

For example, metal powders of the elements are respectively weighed and mixed to a target composition ratio of the mother alloy, and then the mother alloy of the silicon-based alloy may be prepared using a vacuum induction melting furnace. The vacuum induction melting furnace is an apparatus that is capable of melting a metal having a high melting temperature through a high frequency induction. During an initial melting process, an interior of the vacuum induction melting furnace may be evacuated and then backfilled with an inert or inactive gas, such as argon or any other suitable gas, thereby suppressing or reducing oxidation reaction of the prepared mother alloy.

Then, the prepared mother alloy may be melted, and the resulting melt may be subjected to rapid solidification. The rapid solidification is not particularly limited. For example, rapid solidification may be performed by melt spinning, gas atomization, or strip casting. Through the rapid solidification process, an alloy, in which silicon nanoparticles are thoroughly distributed in the matrix, may be prepared.

The rapid solidification may be performed by melt spinning. For example, the melts of the mother alloy may be rapidly solidified while injection-molding the melts through a melt spinner using high frequency induction by a wheel rotating at a high speed. The rapid solidification process may include quenching the melts of the mother alloy at a rate of about $10^3$ K/sec to about $10^7$ K/sec.

Since the melts of the mother alloy are cooled by a wheel rotating at a high speed, the melts are injection-molded into a ribbon shape. The ribbon shape and the size of silicon nanoparticles dispersed in the alloy may vary according to the cooling speed. In order to obtain fine silicon nanoparticles, the cooling speed may be, for example, about 1000° C./s or higher. In addition, in order to obtain uniform silicon nanoparticles, the thickness of the injection-molded product having a ribbon shape may be adjusted to be in the range of, for example, about 5 μm to about 20 μm. For example, the thickness of the ribbon may be adjusted to be in the range of about 7 μm to about 16 μm.

The rapidly solidified alloy that is an injection-molded product having a ribbon shape is pulverized into powder and used as a negative active material. The pulverized alloy may have a D50 in a range of about 1 μm to about 5 μm. The pulverization may be performed by using any suitable method generally available in the art. For example, an apparatus for the pulverization may be an atomizer, a vacuum mill, a ball mill, a planetary ball, a beads mill, or a jet mill. The pulverization may be performed for a time period in a range of about 6 hours to about 48 hours.

Pulverization may be classified into dry pulverization and wet pulverization, both of which may be used herein.

In some embodiments, the negative electrode may include the negative active material. In some embodiments, the lithium battery may include a negative electrode including the negative active material; a positive electrode disposed opposite to the negative electrode; and an electrolyte between the negative electrode and the positive electrode.

The negative electrode and the lithium battery including the negative electrode may be prepared as follows.

The negative electrode having the negative active material may be manufactured, for example, by preparing a negative active material composition through mixing the negative active material, a binder, and, optionally, a conductor in a solvent; and then molding the negative active material composition to a suitable or desired shape or coating the negative active material composition on a current collector, such as copper foil.

The binder used in the negative electrode active material composition assists binding of the negative electrode active material and the conductor, and binding with the current collector. The amount of the binder may be in the range of about 1 to about 50 parts by weight based on 100 parts by weight of the negative active material. For example, the amount of the binder may be in the range of about 1 to about 30 parts by weight, about 1 to about 20 parts by weight, or about 1 to about 15 parts by weight based on 100 parts by weight of the negative active material. Examples of the binder may include polyvinylidenefluoride, polyvinylidenechloride, polybenzimidazole, polyimide, polyvinylacetate, polyacrylonitrile, polyvinyl alcohol, carboxymethylcellulose (CMC), starch, hydroxypropylcellulose, regenerated cellulose, polyvinylpyrrolidone, tetrafluoroethylene, polyethylene, polypropylene, polystyrene, polymethylmethacrylate, polyaniline, acrylonitrilebutadienestyrene, phenol resin, epoxy resin, polyethyleneterephthalate, polytetrafluoroethylene, polyphenylsulfide, polyamideimide, polyetherimide, polyethylenesulfone, polyimide, polyacetal, polyphenyleneoxide, polybutyleneterephthalate, ethylene-propylene-diene monomer (EPDM) rubber, sulfonated EPDM rubber, styrene butadiene rubber, a fluoride rubber, and various suitable copolymers.

The negative electrode may further include a conductor in order to further increase electrical conductivity by providing a sufficient conductive passage to the negative active material. Any suitable conductor generally available in the art of lithium batteries may be used. Examples of the conductor include a carbonaceous material, such as carbon black, acetylene black, Ketjen black, and carbon fiber (for example, a vapor phase growth carbon fiber); a metal-based material, such as copper, nickel, aluminum, and silver, each of which may be used in powder or fiber form; a conductive polymer, such as a polyphenylene derivative; and a mixture thereof. The amount of the conductor may be appropriately controlled. For example, the conductor may be added in such an amount that the weight ratio of the negative active material to the conductor is in the range of about 99:1 to about 90:10.

Examples of the solvent include, but are not limited to, N-methylpyrrolidone (NMP), acetone, and water. The amount of the solvent may be in a range of about 1 to about 10 parts by weight based on 100 parts by weight of the negative active material. When the amount of the solvent is within this range, the process for forming the negative active material layer may be efficiently performed.

In some embodiments, the current collector is generally manufactured to have a thickness of about 3 μm to about 500 μm. The current collector may be any one of various suitable current collectors that do not cause any chemical change in the battery and have conductivity. Examples of the current collector include copper, stainless steel, aluminum, nickel, titanium, calcined carbon, copper or stainless steel that is surface-treated with carbon, nickel, titanium or silver, and aluminum-cadmium alloys. In addition, the current collector may be processed to have fine irregularities on the surface thereof so as to enhance adhesive strength of the current collector to the negative active material, and may be used in any of various suitable forms including films, sheets, foils, nets, porous structures, foams, and non-woven fabrics.

The negative active material composition may be directly coated on the current collector to manufacture the negative electrode plate. Alternatively, the negative electrode plate may be manufactured by casting the negative active material composition on a separate support to form a negative active material film, separating the negative active material film from the support, and laminating the negative active material film on a copper foil current collector. The negative electrode is not limited to the examples described above, and may have various other suitable shapes.

The negative active material composition is not only used in preparation of electrodes of lithium batteries, but also used in preparation of a printable battery by being printed on a flexible electrode substrate.

In some embodiments, for the manufacture of a positive electrode, a positive active material composition is prepared by mixing a positive active material, a conductor, a binder, and a solvent.

Any suitable lithium-containing metal oxide that is generally available in the art may be used as the positive active material. For example, the positive active material may be a compound represented by one of the following formulae: $Li_aA'_{1-b}B_bD_2$ (where $0.90 \le a \le 1$, and $0 \le b \le 0.5$); $Li_aE_{1-b}B_bO_{2-c}D_c$ (where $0.90 \le a \le 1$, $0 \le b \le 0.5$, and $0 \le c \le 0.05$); $LiE_{2-b}B_bO_{4-c}D_c$ (where $0 \le b \le 0.5$, and $0 \le c \le 0.05$); $Li_aNi_{1-b-c}Co_bB_cD_\alpha$ (where $0.90 \le a \le 1$, $0 \le b \le 0.5$, $0 \le c \le 0.05$, and $0 < \alpha \le 2$); $Li_aNi_{1-b-c}Co_bB_cO_{2-\alpha}F_\alpha$ (where $0.90 \le a \le 1$, $0 \le b \le 0.5$, $0 \le c \le 0.05$, and $0 < \alpha < 2$); $Li_aNi_{1-b-c}Co_bB_cO_{2-\alpha}F_2$ (where $0.90 \le a \le 1$, $0 \le b \le 0.5$, $0 \le c \le 0.05$, and $0 < \alpha < 2$); $Li_aNi_{1-b-c}Mn_bB_cD_\alpha$ (where $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}F_\alpha$ (where $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dG_eO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$, and $0.001 \le b \le 0.1$); $Li_aCoG_bO_2$ (where $0.90 \le a \le 1$, and $0.001 \le b \le 0.1$); $Li_aMnG_bO_2$ (where $0.90 \le a \le 1$, and $0.001 \le b \le 0.1$); $Li_aMn_2G_bO_4$ (where $0.90 \le a \le 1$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A' is nickel (Ni), cobalt (Co), manganese (Mn), or a combination thereof; B is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

For example, the positive active material may be $LiCoO_2$, $LiMn_xO_{2x}$ (where $x=1, 2$), $LiNi_{1-x}Mn_xO_{2x}$ (where $0 < x < 1$), $LiNi_{1-x-y}Co_xMn_yO_2$ (where $0 \le x \le 0.5$, and $0 \le y \le 0.5$), or $FePO_4$.

In some embodiments, the conductor, the binder, and the solvent used in the positive active material composition may be the same or substantially the same as those of the negative active material composition as described above. If desired, a plasticizer may further be added to the positive active material composition and the negative active material composition to form pores inside the electrode plates. In this regard, the amounts of the positive active material, the conductor, the binder, and the solvent may be the same or substantially the same as those generally used in the art of lithium batteries.

The positive current collector may be any one of various suitable current collectors that have a thickness in the range of about 3 μm to about 500 μm, do not cause any chemical change in the fabricated battery, and have high conductivity. For example, stainless steel, aluminum, nickel, titanium, calcined carbon, and aluminum or stainless steel that is surface-treated with carbon, nickel, titanium, or silver may be used. The current collector may be processed to have fine bumps on surfaces thereof so as to enhance adhesive strength of the current collector to the positive active material. The positive electrode current collector may be in any of various suitable forms including films, sheets, foils, nets, porous structures, foams, and non-woven fabrics.

In some embodiments, the prepared positive active material composition may be directly coated on the positive current collector and dried to prepare a positive electrode plate. Alternatively, the positive active material composition may be cast on a separate support, and then a film separated from the support is laminated on the positive current collector to prepare the positive electrode plate.

In some embodiments, the positive electrode and the negative electrode may be separated from each other by a separator. Any suitable separator that is generally available in the art of lithium batteries may be used. For example, a separator that has low resistance to migration of ions of an electrolyte and excellent electrolytic solution-retaining ability may be used. Examples of the separator may include glass fiber, polyester, Teflon, polyethylene, polypropylene, polytetrafluoroethylene (PTFE), and a combination thereof, each of which may be a nonwoven fabric or a woven fabric. A pore diameter of the separator is in a range of about 0.01 μm to about 10 μm, and a thickness of the separator is in a range of about 5 μm to about 300 μm.

A lithium salt-containing non-aqueous electrolyte is formed of a non-aqueous electrolyte solution and lithium. As the non-aqueous electrolyte, a non-aqueous electrolyte solution, an organic solid electrolyte, or an inorganic solid electrolyte may be used.

Examples of the non-aqueous electrolyte solution may include any suitable aprotic organic solvent such as N-methyl-2-pyrrolidone, propylene carbonate, ethylene carbonate, butylene carbonate, dimethyl carbonate, diethyl carbonate, fluoroethylene carbonate, ethylene methylene carbonate, methylpropyl carbonate, ethyl propanoate, methyl acetate, ethyl acetate, propyl acetate, dimethyl ester, gamma butyrolactone, 1,2-dimethoxy ethane, tetrahydrofuran, 2-methyl tetrahydrofuran, dimethylsulfoxide, 1,3-dioxolane, formamide, dimethylformamide, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, polyester sulfide, polyvinyl alcohol, polyvinylidene fluoride, and polymers containing ionic dissociation groups.

Examples of the inorganic solid electrolyte may include a lithium nitride (such as $Li_3N$, $LiI$, $Li_5NI_2$, $Li_3N$—$LiI$—$LiOH$), $LiSiO_4$, $LiSiO_4$—$LiI$—$LiOH$, $Li_2SiS_3$, $Li_4SiO_4$—$LiI$—$LiOH$, $Li_3PO_4$—$Li_2S$—$SiS_2$; a halide; and a sulfate.

The lithium salt may be any suitable lithium salt generally available in the art of lithium batteries, and easily dissolves in the non-aqueous electrolyte. The lithium salt may be at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, a lower aliphatic lithium carboxylic acid, lithium tetraphenyl borate, and imide.

Lithium batteries may be classified into lithium ion batteries, lithium ion polymer batteries, and lithium polymer batteries according to the type (or kind) of the separator and electrolyte. In addition, lithium batteries may be classified into a cylindrical type (or kind), a rectangular type (or kind), a coin type (or kind), and a pouch type (or kind) according to the shape of the battery, and may also be classified into a bulk type (or kind) and a thin film type (or kind) according to the size of the battery. Lithium batteries may be used either as primary lithium batteries or secondary lithium batteries.

Any suitable method of manufacturing a lithium battery generally available in the art may be utilized, and therefore, a detailed description thereof will not be provided here.

FIG. 1 is a schematic cross-sectional view illustrating a structure of a lithium battery according to an example embodiment.

Referring to FIG. 1, the lithium battery 200 includes a positive electrode 130, a negative electrode 120, and a separator 140 between the positive electrode 130 and the negative electrode 120. The positive electrode 130, the negative electrode 120, and the separator 140 may be wound or fold to be accommodated in a battery case 150. Then, the battery case 150 is filled with an electrolyte and sealed by a cap assembly member 160, thereby completing the manufacture of the lithium battery 200. The battery case 150 may be a cylindrical type (or kind), a rectangular type (or kind), or a thin-film type (or kind). For example, the lithium battery 30 may be a lithium ion battery.

The lithium batteries may be classified as either winding type (or kind) or stack type (or kind) depending on a structure of electrodes, or as either cylindrical type (or kind), rectangular type (or kind), coin type (or kind), or pouch type (or kind), depending on a type (or kind) of exterior shape thereof.

Lithium batteries may be used as power sources for small devices, and as unit cells of medium- or large-sized battery devices, each module including or consisting of a plurality of cells.

Non-limiting examples of applications of the medium- or large-sized devices include power tools; electric cars, including electric vehicles (EVs), hybrid electric vehicles (HEVs), plug-in hybrid electric vehicles (PHEVs); electric two-wheeled vehicles, including E-bikes and E-scooters; electric golf carts; electric trucks; electric commercial vehicles, and power storage systems. In addition, the lithium battery may be used in any applications that require high-power output and a high voltage, and operate under high-temperature conditions.

Hereinafter example embodiments will be described in detail with reference to Examples and Comparative Examples. These examples are for illustrative purposes only and are not intended to limit the scope of the inventive concept.

Example 1

(Preparation of Negative Active Material)

First, Si and Fe were mixed in a ratio of 85 at % and 15 at %, and the mixture was then inserted into a vacuum induction melting furnace (available from Yein Tech., Korea), in which the mixture was melted under a vacuum atmosphere to inhibit oxidation caused by atmospheric air, to prepare a mother alloy.

The prepared mother alloy was pulverized into large lumps, which were inserted into a melt spinner (available from Yein Tech., Korea). The large lumps were then subjected to a high-frequency induction heating under argon gas atmosphere to melt-mix the mother alloy, and the melt-mixed mother alloy was sprayed onto a revolving Cu wheel through a nozzle to inject the alloy in a ribbon shape, which was then rapidly solidified.

While pulverizing the prepared alloy ribbon for about 20 hours by using a ball mill, 2 parts by weight of graphite (available from Aekyung Petrochemical Co., Ltd) per 100 parts by weight of the prepared alloy ribbon were added thereto, and the mixture of the alloy ribbon and the graphite was pulverized for an additional 4 hours, thereby obtaining silicon-based alloy discontinuously coated with carbon.

Here, the D50 of the alloy was about 2.5 μm, and the D50 of silicon nanoparticles was about 20 nm. Further, the amount of carbon included in the silicon-based alloy was about 1 part by weight per 100 parts by weight of the total amount of Si and Fe, and the amount of carbon coated on the surface of the silicon-based alloy was about 1 part by weight per 100 parts by weight of the total amount of Si and Fe.

(Preparation of Lithium Secondary Battery)
(Preparation of Negative Electrode)

The negative active material prepared in Example 1, polyimide (PI) as a binder, and a carbonaceous conductor (Denka Black) as a conductor were mixed at a weight ratio of 80:10:10, and N-methyl pyrrolidone was added in an amount of 60 wt % of solid to adjust viscosity, to thereby prepare a negative active material composition.

The negative active material composition was coated on a 15 μm-thick copper current collector by using a method that is generally used in the art to have a thickness of about 40 μm. The current collector, on which the negative active material composition was coated, was dried at room temperature, further dried at 120° C., and rolled and punched to prepare a negative electrode for use in a 18650 standard cell.

(Preparation of Positive Electrode)

$LiNi_{1/3}CO_{1/3}Mn_{1/3}O_2$ as a positive active material, polyvinylidene fluoride (PVdF) as a binder, and a carbonaceous conductor (Denka Black) as a conductor were mixed at a weight ratio of 90:5:5, and N-methyl pyrrolidone was added in an amount of 60 wt % of solid to adjust viscosity, to thereby prepare a positive active material composition.

The positive active material composition was coated on a 15 μm-thick aluminum current collector by using a method that is generally used in the art to have a thickness of about 40 μm. The current collector, on which the positive active material composition was coated, was dried at room temperature, further dried at 120° C., and rolled and punched to prepare a positive electrode for use in a 18650 standard cell.

(Preparation of Lithium Secondary Battery-Full Cell)

The prepared negative electrode, prepared positive electrode, and a polypropylene separator having a thickness of 14 μm were used, and an electrolyte was injected therein and then pressed to manufacture a 18650 standard cell. Here, the electrolyte was a solution in which $LiPF_6$ was dissolved to a concentration of 1.10 M in a mixture solution of ethylene carbonate (EC), diethyl carbonate (DEC), and a fluoroethylene carbonate (FEC) (at a volume ratio of 5:70:25 of EC:DEC:FEC).

Example 2

An alloy was prepared in the same manner as in Example 1, except that the amount of added graphite was 3 parts by weight per 100 parts by weight of the alloy ribbon. Here, the D50 of the alloy was about 2.5 μm, and the D50 of silicon nanoparticles was about 20 nm. Further, the amount of carbon included in the silicon-based alloy was about 1 part by weight per 100 parts by weight of the total amount of Si and Fe, and the amount of carbon coated on the surface of the silicon-based alloy was about 2 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 3

An alloy was prepared in the same manner as in Example 1, except that the amount of added graphite was 4 parts by weight per 100 parts by weight of the alloy ribbon. Here, the D50 of the alloy was about 2.5 μm, and the D50 of silicon nanoparticles was about 20 nm. Further, the amount of carbon included in the silicon-based alloy was about 1 part by weight per 100 parts by weight of the total amount of Si and Fe, and the amount of carbon coated on the surface of the silicon-based alloy was about 3 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 4

An alloy was prepared in the same manner as in Example 1, except that the amount of added graphite was 5 parts by weight per 100 parts by weight of the alloy ribbon. Here, the D50 of the alloy was about 2.5 μm, and the D50 of silicon nanoparticles was about 20 nm. Further, the amount of carbon included in the silicon-based alloy was about 1 part by weight per 100 parts by weight of the total amount of Si and Fe, and the amount of carbon coated on the surface of the silicon-based alloy was about 4 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 5

An alloy was prepared in the same manner as in Example 1, except that the amount of added graphite was 6 parts by weight per 100 parts by weight of the alloy ribbon. Here, the D50 of the alloy was about 2.5 μm, and the D50 of silicon nanoparticles was about 20 nm. Further, the amount of carbon included in the silicon-based alloy was about 2 parts by weight per 100 parts by weight of the total amount of Si and Fe, and the amount of carbon coated on the surface of the silicon-based alloy was about 4 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 6

An alloy was prepared in the same manner as in Example 1, except that the amount of added graphite was 9 parts by weight per 100 parts by weight of the alloy ribbon. Here, the D50 of the alloy was about 2.5 μm, and the D50 of silicon nanoparticles was about 20 nm. Further, the amount of carbon included in the silicon-based alloy was about 3 parts by weight per 100 parts by weight of the total amount of Si and Fe, and the amount of carbon coated on the surface of the silicon-based alloy was about 6 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 7

An alloy was prepared in the same manner as in Example 1, except that the amount of added graphite was 10 parts by weight per 100 parts by weight of the alloy ribbon. Here, the D50 of the alloy was about 2.5 μm, and the D50 of silicon nanoparticles was about 20 nm. Further, the amount of carbon included in the silicon-based alloy was about 4 parts by weight per 100 parts by weight of the total amount of Si and Fe, and the amount of carbon coated on the surface of the silicon-based alloy was about 6 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 8

While an alloy ribbon prepared in the same manner as in Example 1 was being pulverized by using a ball mill for about 14 hours, 5 parts by weight of graphite per 100 parts by weight of the prepared alloy ribbon were added thereto and was pulverized for an additional 10 hours, thereby obtaining a silicon-based alloy discontinuously coated with carbon.

Here, the D50 of the alloy was about 2.5 μm, and the D50 of silicon nanoparticles was about 20 nm. Further, the amount of carbon included in the silicon-based alloy was about 2 parts by weight per 100 parts by weight of the total amount of Si and Fe, and the amount of carbon coated on the surface of the silicon-based alloy was about 3 parts by weight per 100 parts by weight of the total amount of Si and Fe.

A lithium secondary battery was prepared in the same manner as in Example 4, except that the alloy prepared in this embodiment was used as the negative active material instead of the alloy prepared in Example 4.

Example 9

While an alloy ribbon prepared in the same manner as in Example 1 was being pulverized by using a ball mill for about 8 hours, 5 parts by weight of graphite per 100 parts by weight of the prepared alloy ribbon were added thereto and was pulverized for an additional 16 hours, thereby obtaining a silicon-based alloy discontinuously coated with carbon.

Here, the D50 of the alloy was about 2.5 μm, and the D50 of silicon nanoparticles was about 20 nm. Further, the amount of carbon included in the silicon-based alloy was about 3 parts by weight per 100 parts by weight of the total amount of Si and Fe, and the amount of carbon coated on the surface of the silicon-based alloy was about 2 parts by weight per 100 parts by weight of the total amount of Si and Fe.

A lithium secondary battery was prepared in the same manner as in Example 4, except that the alloy prepared in this embodiment was used as the negative active material instead of the alloy prepared in Example 4.

Example 10

An alloy in the form of a silicon-based alloy, discontinuously coated with boron, was prepared in the same manner as in Example 1, except that boric acid (available from Aldrich Co., Ltd) was used instead of graphite to add an amount of 2 parts of boron by weight per 100 parts by weight of the alloy ribbon thereinto. Here, the D50 of the alloy was about 2.5 μm, and the D50 of silicon nanoparticles was about 20 nm. Further, the amount of boron included in the silicon-based alloy was about 1 part by weight per 100 parts by weight of the total amount of Si and Fe, and the amount of boron coated on the surface of the silicon-based alloy was about 1 part by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 11

An alloy in the form of a silicon-based alloy, discontinuously coated with boron, was prepared in the same manner as in Example 1, except that boric acid (available from Aldrich Co., Ltd) was used instead of graphite to add an amount of 6 parts of boron by weight per 100 parts by weight of the alloy ribbon thereinto. Here, the D50 of the alloy was about 2.5 μm, and the D50 of silicon nanoparticles was about 20 nm. Further, the amount of boron included in the silicon-based alloy was about 2 parts by weight per 100 parts by weight of the total amount of Si and Fe, and the amount of boron coated on the surface of the silicon-based alloy was about 4 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 12

An alloy in the form of a silicon-based alloy, discontinuously coated with boron, was prepared in the same manner as in Example 1, except that boric acid (available from Aldrich Co., Ltd) was used instead of graphite to add an amount of 9 parts of boron by weight per 100 parts by weight of the alloy ribbon thereinto. Here, the D50 of the alloy was about 2.5 μm, and the D50 of silicon nanoparticles was about 20 nm. Further, the amount of boron included in the silicon-based alloy was about 3 parts by weight per 100 parts by weight of the total amount of Si and Fe, and the amount of boron coated on the surface of the silicon-based alloy was about 6 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 13

An alloy in the form of a silicon-based alloy, discontinuously coated with boron, was prepared in the same manner as in Example 1, except that boric acid (available from Aldrich Co., Ltd) was used instead of graphite to add an amount of 10 parts of boron by weight per 100 parts by weight of the alloy ribbon thereinto. Here, the D50 of the alloy was about 2.5 μm, and the D50 of silicon nanoparticles was about 20 nm. Further, the amount of boron included in the silicon-based alloy was about 4 parts by weight per 100 parts by weight of the total amount of Si and Fe, and the amount of boron coated on the surface of the silicon-based alloy was about 6 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Example 14

An alloy was prepared in the same manner as in Example 6, except that iron oxide $Fe_2O_3$ (available from Aldrich Co., Ltd) was further added to add an amount of 2 parts of oxygen by weight per 100 parts by weight of the total amount of Si and Fe in the preparation of the mother alloy.

Here, the D50 of the alloy was about 2.5 μm, and the D50 of silicon nanoparticles was about 20 nm. Further, the amount of carbon included in the silicon-based alloy was about 3 parts by weight per 100 parts by weight of the total amount of Si and Fe, and the amount of carbon coated on the surface of the silicon-based alloy was about 6 parts by weight per 100 parts by weight of the total amount of Si and Fe.

A lithium secondary battery was prepared in the same manner as in Example 6, except that the alloy prepared in this embodiment was used as the negative active material instead of the alloy prepared in Example 6.

Example 15

An alloy was prepared in the same manner as in Example 6, except that iron oxide $Fe_2O_3$ (available from Aldrich Co., Ltd) was further added to add an amount of 4 parts of oxygen by weight per 100 parts by weight of the total amount of Si and Fe in the preparation of the mother alloy.

Here, the D50 of the alloy was about 2.5 μm, and the D50 of silicon nanoparticles was about 20 nm. Further, the amount of carbon included in the silicon-based alloy was about 3 parts by weight per 100 parts by weight of the total amount of Si and Fe, and the amount of carbon coated on the surface of the silicon-based alloy was about 6 parts by weight per 100 parts by weight of the total amount of Si and Fe.

A lithium secondary battery was prepared in the same manner as in Example 6, except that the alloy prepared in this embodiment was used as the negative active material instead of the alloy prepared in Example 6.

Example 16

An alloy was prepared in the same manner as in Example 6, except that iron oxide $Fe_2O_3$ (available from Aldrich Co., Ltd) was further added to add an amount of 6 parts of oxygen by weight per 100 parts by weight of the total amount of Si and Fe in the preparation of the mother alloy.

Here, the D50 of the alloy was about 2.5 μm, and the D50 of silicon nanoparticles was about 20 nm. Further, the amount of carbon in the silicon-based alloy was about 3 parts by weight per 100 parts by weight of the total amount of Si and Fe, and the amount of carbon coated on the surface of the silicon-based alloy was about 6 parts by weight per 100 parts by weight of the total amount of Si and Fe.

A lithium secondary battery was prepared in the same manner as in Example 6, except that the alloy prepared in this embodiment was used as the negative active material instead of the alloy prepared in Example 6.

Comparative Example 1 (in the Case that the Additional Element (A) is not Added)

A silicon-based alloy was prepared in the same manner as in Example 1, except that graphite was not added. Here, the D50 of the silicon based alloy was about 2.4 μm, and the D50 of silicon nanoparticles was about 20 nm.

A lithium secondary battery was prepared in the same manner as in Example 1, except that the alloy prepared in this embodiment was used as the negative active material instead of the alloy prepared in Example 1.

Comparative Example 2 (in the Case that the Additional Element (A) is not on Surface of Alloy)

A silicon-based alloy in which carbon was included in the silicon-based alloy but was not on a surface thereof was prepared in the same manner as in Example 1, except that graphite was added, in an amount of 5 parts by weight per 100 parts by weight of the total amount of Si and Fe, with Si and Fe simultaneously added during the preparation of the mother alloy, but without adding graphite thereafter. Here, the D50 of the alloy was about 2.7 μm, and the D50 of silicon nanoparticles was about 25 nm. Further, the amount of carbon included in the silicon-based alloy was about 5 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Comparative Example 3 (in the Case that the Additional Element (A) is not Included in the Alloy)

A silicon-based alloy in which carbon was discontinuously coated on a surface thereof but was not included in the silicon-based alloy was prepared in the same manner as in Example 1, except that graphite was added, in an amount of 5 parts by weight per 100 parts by weight of the pulverized alloy ribbon, to be blended with the pulverized alloy ribbon after the completion of the pulverization instead of being added during the pulverization of the alloy ribbon. Here, the D50 of the alloy was about 3.0 μm, and the D50 of silicon nanoparticles was about 26 nm. Further, the amount of carbon coated on the surface of the silicon-based alloy was about 5 parts by weight per 100 parts by weight of the total amount of Si and Fe.

A lithium secondary battery was prepared in the same manner as in Example 1, except that the alloy prepared in this embodiment was used as the negative active material instead of the alloy prepared in Example 1.

Analysis of Negative Active Material

Evaluation Example 1: Measurement of Internal Porosity of Negative Active Material Internal porosity of the alloys prepared in Examples 1 to 16 and Comparative Examples 1 to 3 was measured, using the following method.

First, 5 g of the alloy was placed in a conductivity measurement system (MCP-PD51, available from Mitsubishi Chemical Corporation) in order to measure a density of the alloy under a pressure of about 20 kN. Then, the density of the alloy was measured while applying a pressure of 20 kN thereto. The measurement was repeated five times, and the average density of the alloy was determined. In this regard, the measurement was performed at 25° C.

Next, 5 g of the alloy was prepared in order to measure the true density of the alloy, and then helium, an inert gas, was used to measure the true density using a gas pycnometer (TM1330, available from Micromeritics AccuPyc™). The measurement was repeated five times to obtain the average value thereof, which was taken as a true density value of the alloy. In this regard, the measurement was performed at 25° C.

Then, the internal porosity of the alloy was calculated according to Mathematical Equation 1. The results thereof are shown in Table 1 and FIG. 2.

Figure 2:
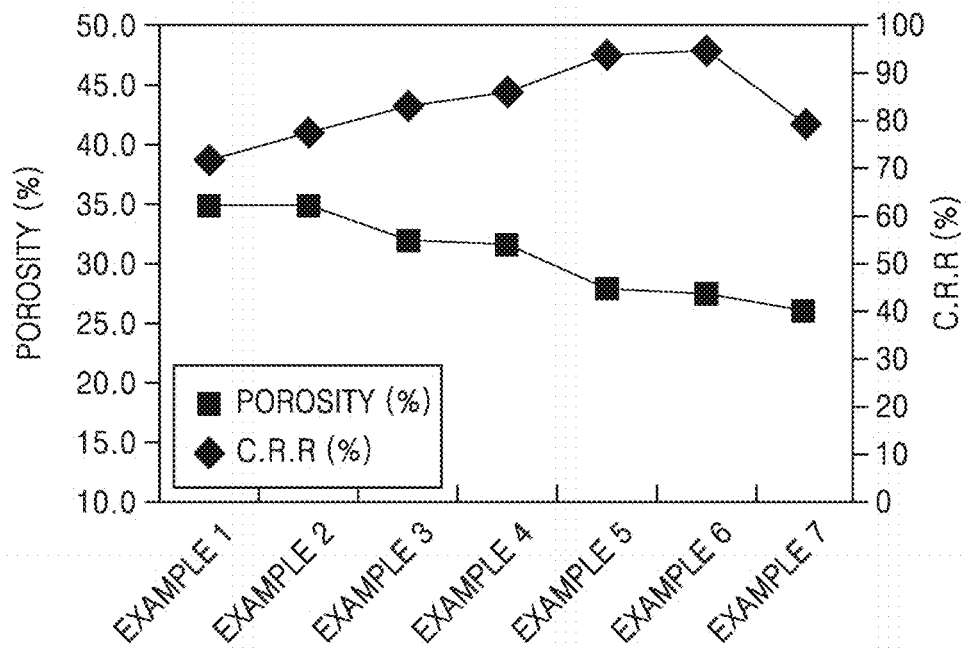
FIG. 2 is a graph illustrating results of internal porosity measurement with respect to the alloys prepared in Examples 1 to 7.

As shown in Table 1 and FIG. 2, the silicon-based alloy of Examples 1 to 13 including carbon or boron inside the alloy may have a low internal porosity of the alloy as compared to the silicon-based alloy of Comparative Examples 1 and 3, which do not include carbon inside the alloy. In addition, the silicon-based alloy of Comparative Example 2 including carbon only inside the alloy had an internal porosity of about 35% or more. This indicates that carbon inside the alloy of Comparative Example 2 formed an alloy with Si and/or Fe to serve as a matrix, but did not contribute to a decrease of pores (or a decrease of internal porosity).

Further, as the amount of carbon or boron inside the silicon-based alloy increased, the porosity inside the alloy decreased. Therefore, it was found that an internal porosity of silicon-based alloy may be adjusted by adjusting an amount of carbon or boron included in the silicon-based alloy.

Further, when the silicon-based alloy additionally included oxygen atoms inside the alloy such as, for example, the silicon-based alloys of Examples 14 to 16, the silicon-based alloy had a low internal porosity as compared to that of Example 6. Accordingly, it was found that the density of the alloy decreased due to inclusion of a compound containing oxygen atoms.

Evaluation Example 2: Analysis of Surface and Cross Section of Negative Active Material In order to verify the shape of the alloy, the alloy prepared in Example 1 was subjected to a scanning electron microscopy (SEM) analysis at a magnification of 1000 times. The results thereof are shown in the left side of FIG. 3.

Figure 3:
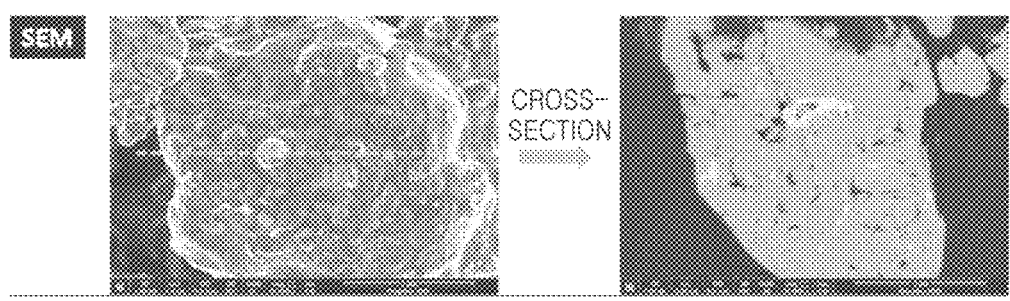
FIG. 3 is a scanning electron microscope (SEM) image (at a magnification of 1000 times) of the alloy prepared in Example 1, and an SEM image of a cross section of the alloy.
Figure 4:
FIGS. 4 to 6 are SEM images (at a magnification of 3000 times) of cross sections of the alloys prepared in Examples 3 to 5, respectively.
Figure 5:
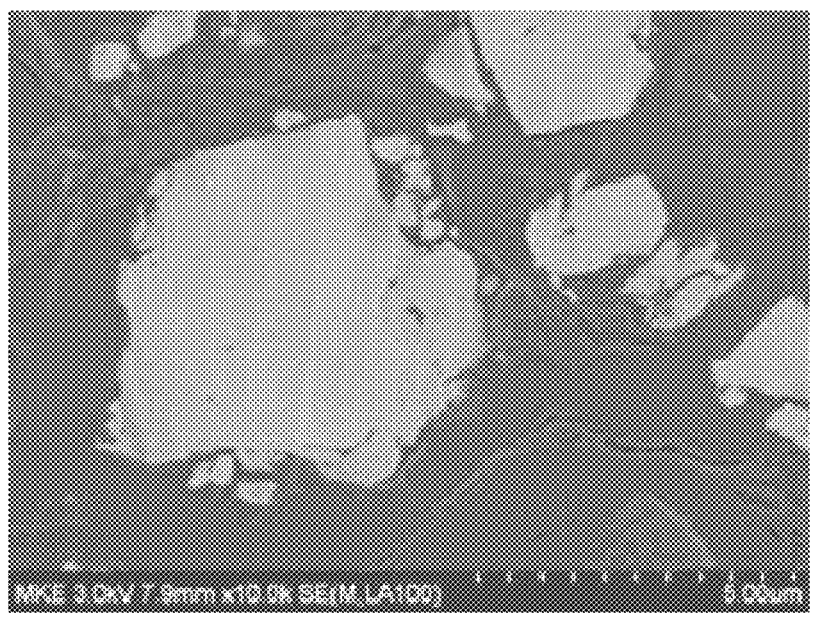
Figure 6:
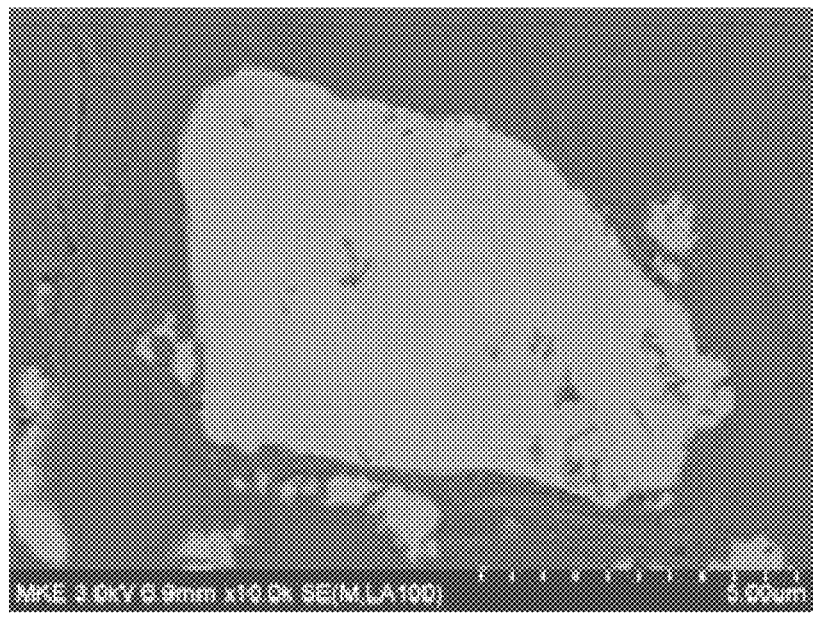
Figure 7:
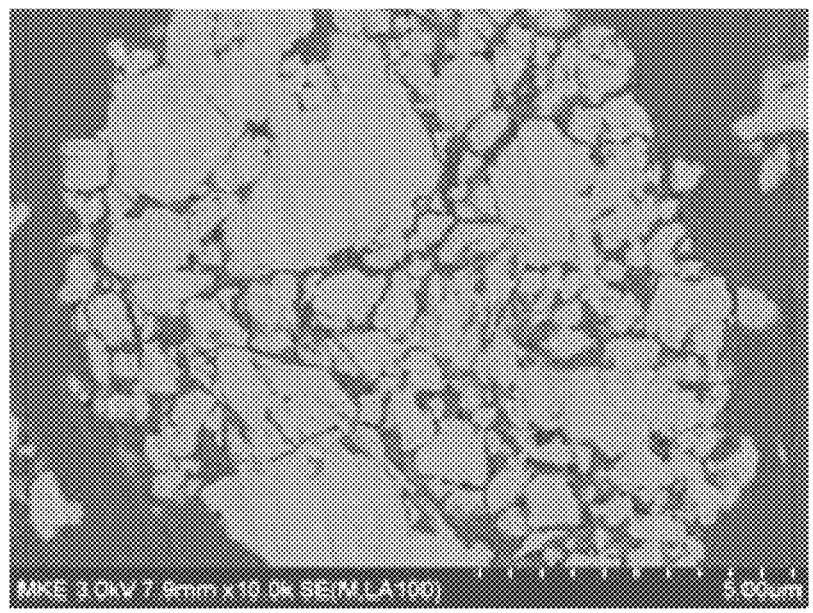
FIG. 7 is an SEM image (at a magnification of 3000 times) of a cross section of the alloy prepared in Comparative Example 1.

As shown in the left side of FIG. 3, it was confirmed that the surface of alloy was discontinuously coated with island-type (or kind) carbon.

TABLE 1

| | Composition Ratio (atom %) | | Total amount of C or B* (parts by weight) | | Total amount of O* (parts by weight) | Amount of C or B in the alloy* (parts by weight) | | Amount of C or B on the surface of the alloy* (parts by weight) | | Amount of O in the alloy* (parts by weight) | True density of the alloy (g/cc) | Density of the alloy (g/cc, @20 kN) | Internal porosity of the alloy (%) |
|---|---|---|---|---|---|---|---|---|---|---|---|---|---|
| | Si | Fe | C | B | | C | B | C | B | | | | |
| Example 1 | 85 | 15 | 2 | — | — | 1 | — | 1 | — | — | 3.498 | 2.275 | 34.96 |
| Example 2 | 85 | 15 | 3 | — | — | 1 | — | 2 | — | — | 3.686 | 2.400 | 34.89 |
| Example 3 | 85 | 15 | 4 | — | — | 1 | — | 3 | — | — | 3.630 | 2.468 | 32.01 |
| Example 4 | 85 | 15 | 5 | — | — | 1 | — | 4 | — | — | 3.600 | 2.458 | 31.72 |
| Example 5 | 85 | 15 | 6 | — | — | 2 | — | 4 | — | — | 3.498 | 2.520 | 27.96 |
| Example 6 | 85 | 15 | 9 | — | — | 3 | — | 6 | — | — | 3.580 | 2.590 | 27.65 |
| Example 7 | 85 | 15 | 10 | — | — | 4 | — | 6 | — | — | 3.530 | 2.610 | 26.06 |
| Example 8 | 85 | 15 | 5 | — | — | 2 | — | 3 | — | — | 3.623 | 2.500 | 30.99 |
| Example 9 | 85 | 15 | 5 | — | — | 3 | — | 2 | — | — | 3.629 | 2.510 | 30.83 |
| Example 10 | 85 | 15 | — | 2 | — | — | 1 | — | 1 | — | 3.534 | 2.300 | 34.92 |
| Example 11 | 85 | 15 | — | 6 | — | — | 2 | — | 4 | — | 3.513 | 2.365 | 32.67 |
| Example 12 | 85 | 15 | — | 9 | — | — | 3 | — | 6 | — | 3.590 | 2.420 | 32.59 |
| Example 13 | 85 | 15 | — | 10 | — | — | 4 | — | 6 | — | 3.556 | 2.440 | 31.38 |
| Example 14 | 85 | 15 | 9 | — | 2 | 3 | — | 6 | — | 2 | 3.610 | 2.650 | 26.59 |
| Example 15 | 85 | 15 | 9 | — | 4 | 3 | — | 6 | — | 4 | 3.590 | 2.690 | 25.07 |
| Example 16 | 85 | 15 | 9 | — | 6 | 3 | — | 6 | — | 6 | 3.620 | 2.750 | 24.03 |
| Comparative Example 1 | 85 | 15 | — | — | — | — | — | — | — | — | 3.521 | 2.225 | 36.80 |
| Comparative Example 2 | 85 | 15 | 5 | — | — | 5 | — | — | — | — | 3.505 | 2.170 | 38.10 |
| Comparative Example 3 | 85 | 15 | 5 | — | — | — | — | 5 | — | — | 3.585 | 2.133 | 40.50 |

(*the total amount of C or B and O, the amount of C or B in the alloy, the amount of C or B on the surface of the alloy, and the amount of O in the alloy were measured based on 100 parts by weight of the total amount of Si and Fe)

Then, in order to verify the porosity inside the alloy, cross sections of the alloys prepared in Examples 1 and 3 to 6 and Comparative Example 1 were analyzed by using SEM. For example, the SEM analyses was performed at a magnification of 3000 times. The results thereof are shown in FIGS. 3 to 7.

It was found that the alloys prepared in Examples 3 to 6 (referring to FIGS. 3 to 6), which included carbon or boron inside the silicon-based alloy, had substantially decreased pores (decreased internal porosity) inside the alloy as compared to the alloy prepared in Comparative Example 1 (refer to FIG. 7), which did not include carbon inside the silicon-based alloy. Further, it was found that as the amount of carbon included in the silicon-based alloy increases, pores (internal porosity) inside the alloy decreases. This is consistent with the trend of the porosity measured in Evaluation Example 1.

Evaluation Example 3: Analysis of Inside Component of Negative Active Material

In order to analyze the inside components of the alloy prepared in Example 1, transmission electron microscopy (TEM) analysis (at a magnification of 130,000 times) was performed thereon. The results thereof are shown in FIGS. 8A-8D. In order to perform a componential analysis, a portion of FIG. 8A is shown with different brightness levels (FIGS. 8B, 8C, and 8D). The bright portion in FIG. 8B indicates Si particles, the bright portion in FIG. 8D indicates carbon, and the gray portion in FIG. 8C indicates compounds including or consisting of Si and Fe. As shown in FIG. 8Ay, Si particles (indicated in gray) are dispersed in the matrix formed of the compounds including or consisting of Si and Fe (indicated in black), and irregularly shaped carbon (indicated in white) is included in the matrix. Accordingly, it was found that pores (internal porosity) inside the alloy decreased due to the carbon.

Figure 9:
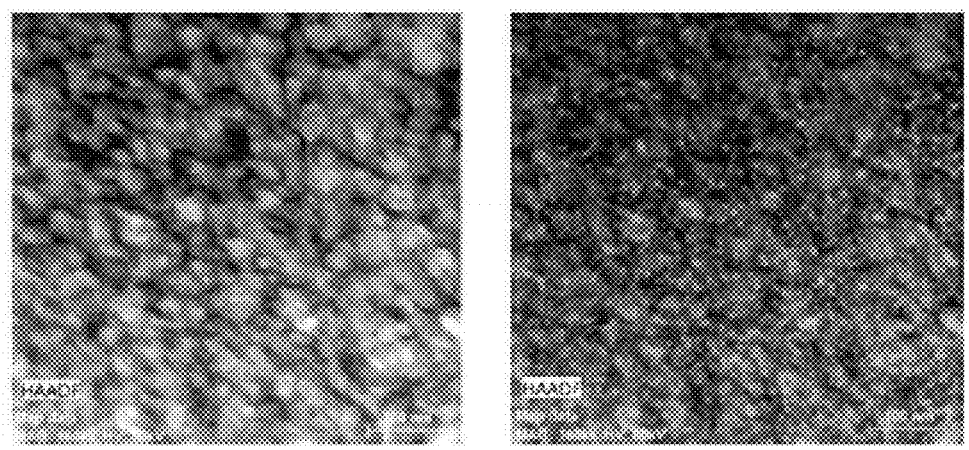
FIG. 9 is a high angle annular dark field-scanning transmission electron microscope (HAADF-STEM) analysis image (at a magnification of 150,000 times) of a cross section of the alloy prepared in Example 14.

In addition, in order to analyze inside components of the alloy prepared in Example 14, a high angle annular dark field scanning transmission electron microscope (HAADF-STEM) analysis and an energy dispersive X-ray (EDX) analysis with respect to oxygen atoms were performed thereon. The results are shown in FIG. 9. As shown in the left picture of FIG. 9, it was found that Si particles (indicated in black) are dispersed in the matrix formed of the compounds including or consisting of Si and Fe (indicated in gray). As a result of oxygen atom EDX analysis on this picture, it was found that oxygen atoms (indicated in green) are evenly dispersed at an interface between Si particles and the compounds including or consisting of Si and Fe (refer to the right picture of FIG. 9).

Figure 10:
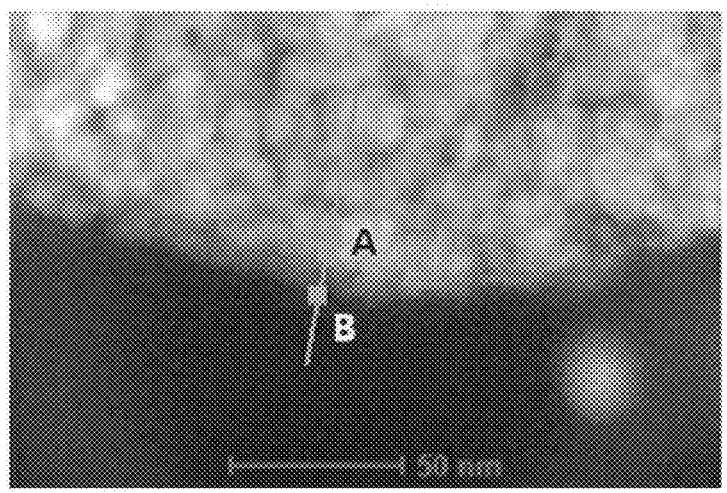
FIG. 10 is a HAADF-STEM analysis image (at a magnification of 350,000 times) of a portion of the cross section of the alloy of FIG. 9.

In this regard, in order to analyze components of the compound containing oxygen atoms, HAADF-STEM analysis (at a magnification of 350,000 times) was performed again on a portion of the green portion in the right picture of FIG. 9. The results thereof are shown in FIG. 10. Thereafter, EDX analysis was performed on the full line portion in FIG. 10. The results thereof are shown in FIG. 11.

Figure 11:
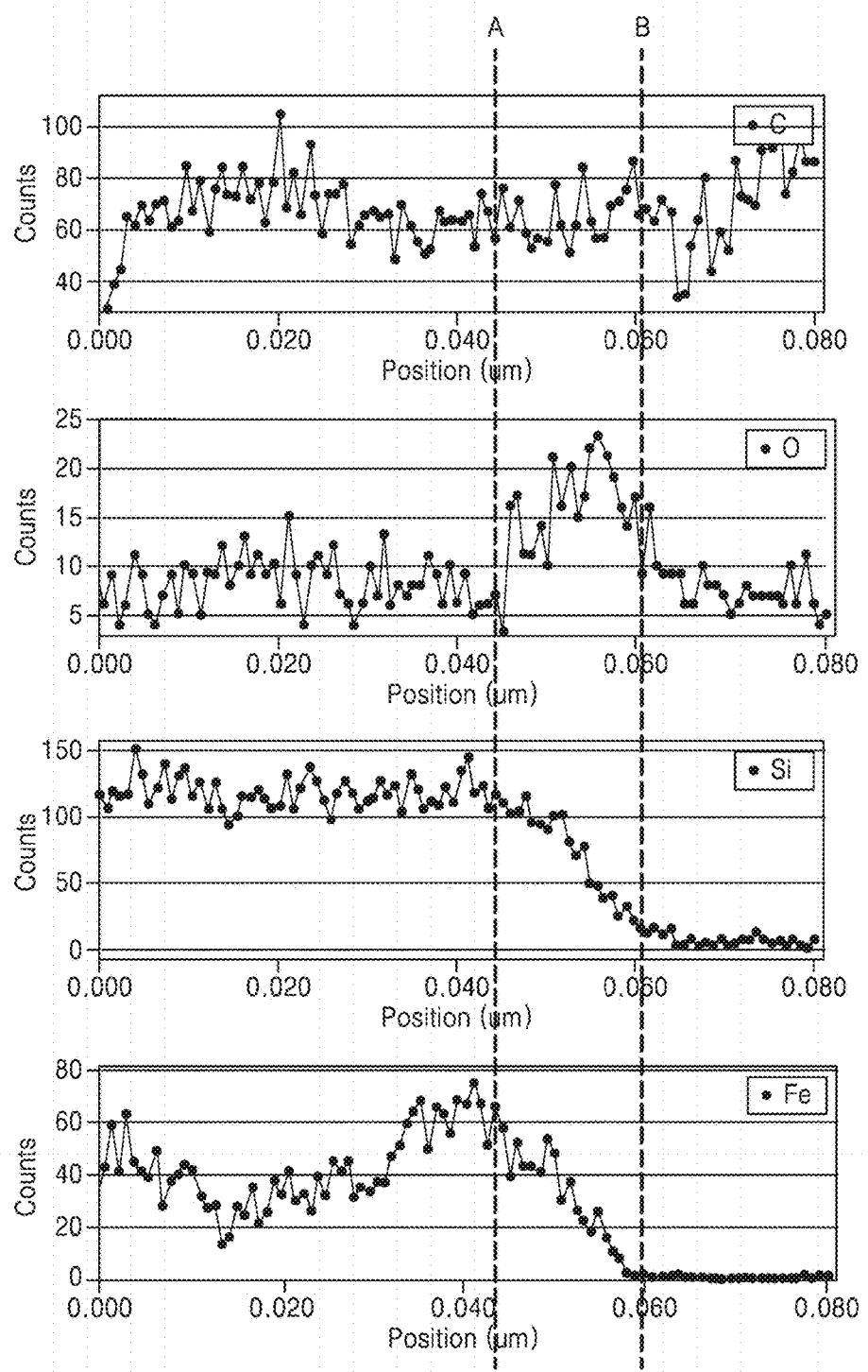
FIG. 11 is a graph illustrating the respective intensity of C, O, Si, and Fe elements based on energy dispersive X-ray (EDX) analyses performed on the full line portion of the alloy of FIG. 10.

Referring to FIG. 11, along the portion A and B in FIG. 10, the amount of O increased, while the respective amounts of Si and Fe decreased, which indicates that compounds included along the portion A to B in FIG. 10 are compounds containing oxygen atoms. From a thermodynamic point of view in consideration of the free energy of Gibbs, oxygen atoms are expected to first combine with Si to produce a stable compound, since the affinity of Si and O is greater than the affinity of Fe and O. Particularly, $-\Delta G^{0}_{298}$ (25° C.) of $SiO_2$ is 805067 J/mol, and $-\Delta G^{0}_{298}$ (25° C.) of $Fe_2O_3$ is 744224 J/mol. Thus, the compounds containing oxygen atoms prepared in the Example more contain $SiO_2$ than $Fe_2O_3$.

Figure 12:
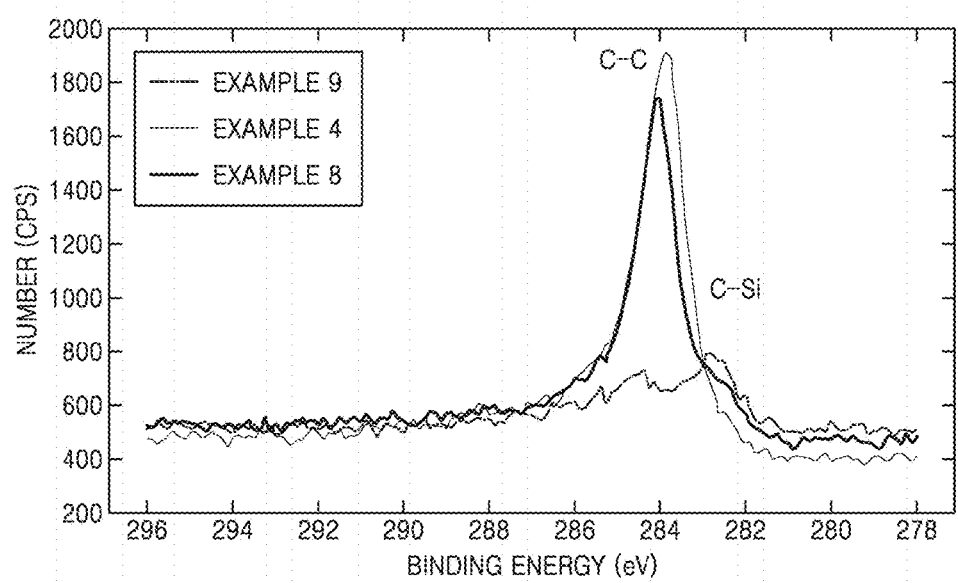
FIG. 12 is a graph illustrating X-ray photoelectron spectroscopy (XPS) results obtained for the alloys prepared in Examples 4, 8, and 9.

Evaluation Example 4: Componential Analysis of Inside and Surface of Negative Active Material In order to analyze existence forms of carbon inside and outside the alloys prepared in Examples 4, 8, and 9, X-ray photoelectron spectroscopy (XPS) was performed thereon. The results thereof are shown in FIG. 12.

In the XPS graph, the peak at about 283 eV to about 285 eV means that there are C—C bonds of the test sample, and the peak at about 282 eV to 283 eV means that there are Si—C bonds of the test sample. Referring to FIG. 12, it was found that although the same total amount of carbon is included in the alloy, when the silicon-based alloy contains more amount of carbon coated on a surface thereof, the silicon-based alloy contains more C—C bonds (Example 4), and when the silicon-based alloy contains more amount of carbon thereinside, the silicon-based alloy contains more Si—C bonds (Example 9), which results from a portion of the carbon inside the alloy being combined with Si, forming a SiC compound.

Evaluation Example 5: Analysis of Inside of Negative Active Material of Lithium Battery after Charging and Discharging After charging and discharging, in order to verify changes of carbonaceous materials inside alloy, the lithium secondary battery prepared in Example 1 was charged at a current rate of 1.0 C in a constant current mode (CC mode) until it reached a charging cutoff voltage of 4.2 V (vs. Li) at 25° C. Then, the battery was charged at a voltage of 4.2V in a constant voltage mode (CV mode) unit the current rate reached 0.01 C. Then, the battery was discharged at 0.2 C. in CC mode until the voltage reached 2.5 V of a discharging cutoff voltage. Then, the charging and discharging cycle was repeated up to 100 times utilizing the same current and voltage intervals. TEM analysis was performed on the inside of the alloy which had gone through charging and discharging 100 times. The results thereof are shown in FIG. 13.

Figure 13:
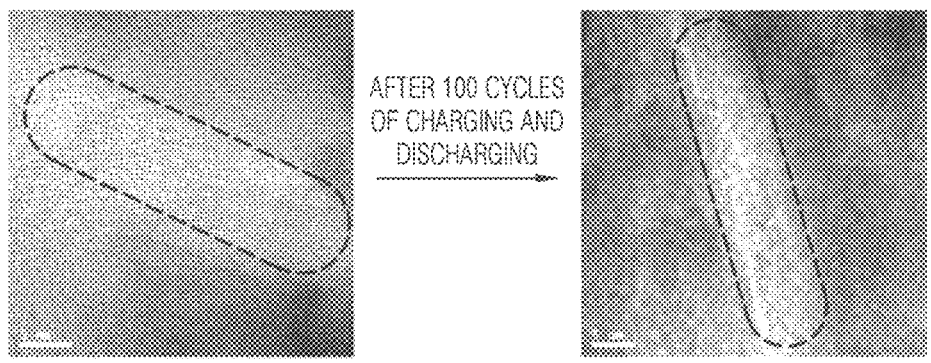
FIG. 13 is a TEM image (at a magnification of 530,000 times) of the inside of the alloy of the lithium secondary battery prepared in Example 1 before and after 100 cycles of charging and discharging.

The element within the dotted ellipse in FIG. 13 is carbon. Referring to FIG. 13, it was found that carbon included in the alloy is in a similar shape, even after 100 cycles of lithium battery charging and discharging. This means that generation of side-products, which may be caused by electrolyte, was suppressed by carbon filling pores inside the alloy.

Evaluation Example 6: Evaluation of Lifespan Characteristics of Lithium Battery

Lithium secondary batteries prepared in Examples 1 to 17 and Comparative Examples 1 to 3 were charged and discharged following the method in Evaluation Example 5, the charging and discharging cycle was repeated up to 100 times utilizing the same current and voltage intervals in order to measure capacity retention rates (CRR). The results thereof are shown in Table 2, FIGS. 2, 14, and 15. CRR is determined by Mathematical Equation 2:

Capacity retention rate[%]=[Discharge capacity at each cycle/Discharge capacity at 1$^{st}$ cycle]×100     Mathematical Equation 2

TABLE 2

| | Composition Ratio (atom %) | | Total amount of C or B* (parts by weight) | | Total amount of O* (parts by weight) | Amount of C or B in the alloy* (parts by weight) | | Amount of C or B on the surface of the alloy* (parts by weight) | | Amount of O in the alloy* (parts by weight) | Porosity (%) inside the alloy | $100^{th}$ CRR (%) |
|---|---|---|---|---|---|---|---|---|---|---|---|---|
| | Si | Fe | C | B | | C | B | C | B | | | |
| Example 1 | 85 | 15 | 2 | — | — | 1 | — | 1 | — | — | 34.96 | 72 |
| Example 2 | 85 | 15 | 3 | — | — | 1 | — | 2 | — | — | 34.89 | 78 |
| Example 3 | 85 | 15 | 4 | — | — | 1 | — | 3 | — | — | 32.01 | 83 |
| Example 4 | 85 | 15 | 5 | — | — | 1 | — | 4 | — | — | 31.72 | 86 |
| Example 5 | 85 | 15 | 6 | — | — | 2 | — | 4 | — | — | 27.96 | 94 |
| Example 6 | 85 | 15 | 9 | — | — | 3 | — | 6 | — | — | 27.65 | 95 |
| Example 7 | 85 | 15 | 10 | — | — | 4 | — | 6 | — | — | 26.06 | 80 |
| Example 8 | 85 | 15 | 5 | — | — | 2 | — | 3 | — | — | 30.99 | 82.2 |
| Example 9 | 85 | 15 | 5 | — | — | 3 | — | 2 | — | — | 30.83 | 78.6 |
| Example 10 | 85 | 15 | — | 2 | — | — | 1 | — | 1 | — | 34.92 | 72 |
| Example 11 | 85 | 15 | — | 6 | — | — | 2 | — | 4 | — | 32.67 | 82 |
| Example 12 | 85 | 15 | — | 9 | — | — | 3 | — | 6 | — | 32.59 | 71 |
| Example 13 | 85 | 15 | — | 10 | — | — | 4 | — | 6 | — | 31.38 | 70 |
| Example 14 | 85 | 15 | 9 | — | 2 | 3 | — | 6 | — | 2 | 26.59 | 95 |
| Example 15 | 85 | 15 | 9 | — | 4 | 3 | — | 6 | — | 4 | 25.07 | 96 |
| Example 16 | 85 | 15 | 9 | — | 6 | 3 | — | 6 | — | 6 | 24.03 | 97 |
| Comparative Example 1 | 85 | 15 | — | — | — | — | — | — | — | — | 36.80 | 69 |
| Comparative Example 2 | 85 | 15 | 5 | — | — | 5 | — | — | — | — | 38.10 | 61 |
| Comparative Example 3 | 85 | 15 | 5 | — | — | — | — | 5 | — | — | 40.50 | 55 |

(*the total amount of C or B and O, the amount of C or B in the alloy, the amount of C or B on the surface of the alloy, and the amount of O in the alloy were measured based on 100 parts by weight of the total amount of Si and Fe)

Figure 14:
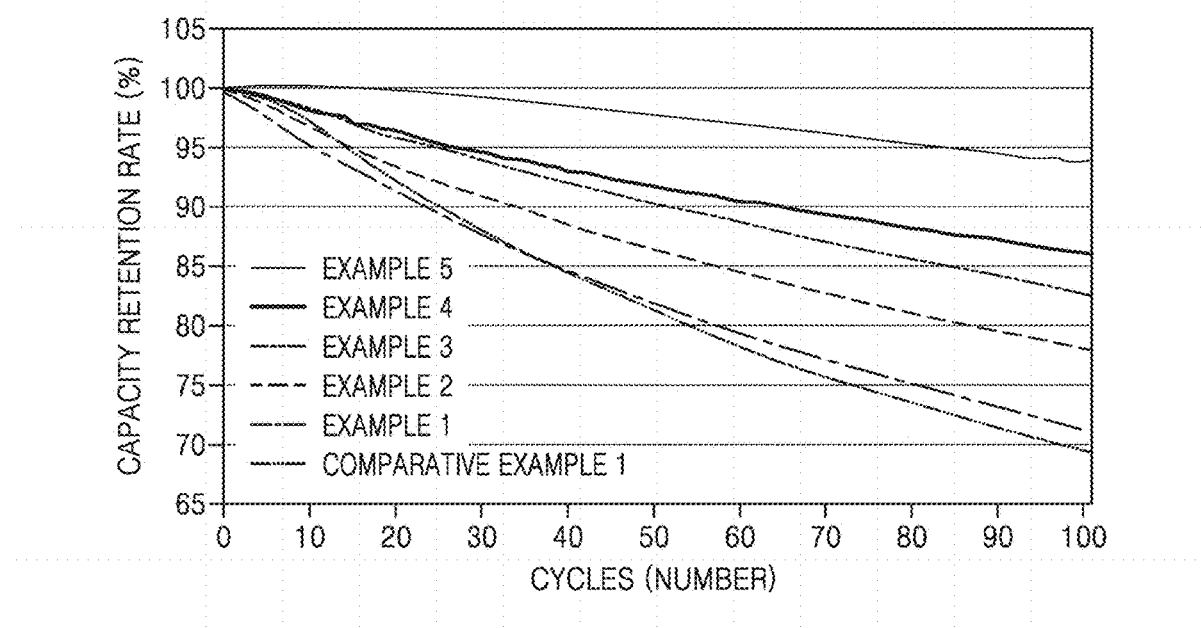
FIG. 14 is a graph illustrating capacity retention rates according to cycle for lithium secondary batteries prepared in Examples 1 to 5 and Comparative Example 1.
Figure 15:
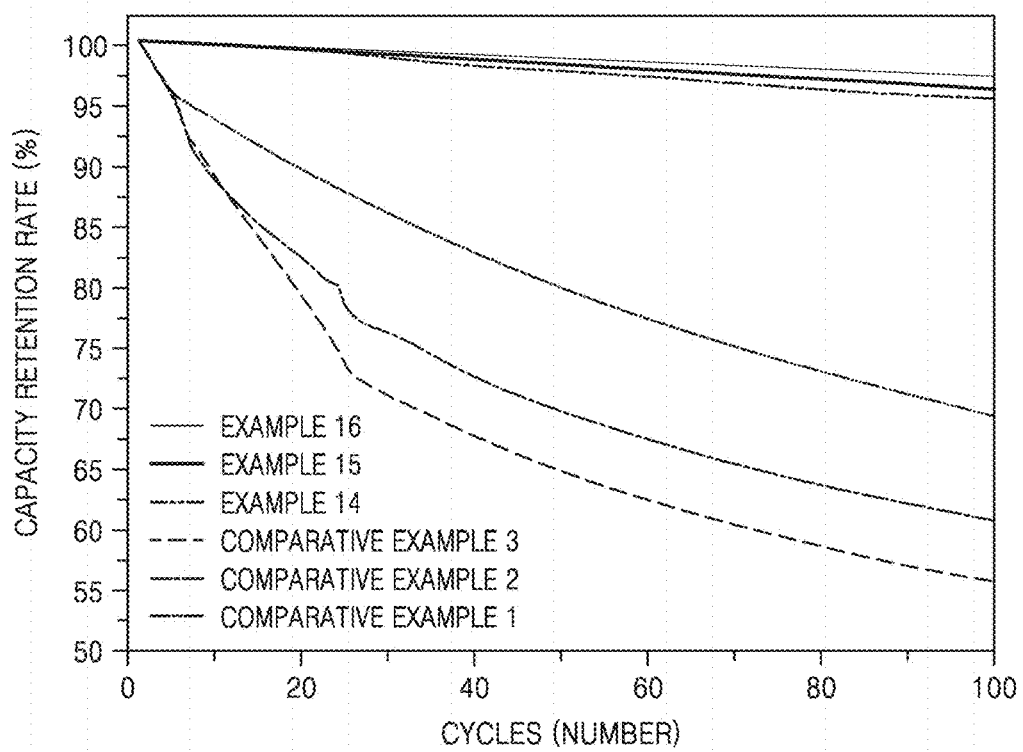
FIG. 15 is a graph illustrating capacity retention rates of lithium secondary batteries prepared in Examples 14 to 16 and Comparative Examples 1 to 3 according to cycles.

Referring to Table 2 and FIGS. 14 and 15, it was found that the silicon-based alloy prepared in Examples 1 to 13, in which the alloys contain carbon or boron thereinside, had improved lifespan characteristics as compared to the silicon-based alloys prepared in Comparative Examples 1 to 3, in which the alloys do not include either carbon or boron thereinside or on a surface thereof. In addition, it was found that as the amount of carbon or boron inside the silicon-based alloy increases, lifespan characteristics of the lithium secondary battery improves. This is consistent with the trend of the internal porosity measured in Evaluation Example 1.

Further, referring to FIG. 2, it was found that lifespan characteristics of lithium batteries improves more when the silicon-based alloy contains a certain amount of carbon or boron thereinside, because a certain amount of pores in the alloy serve as buffers to expansion of Si when charging and discharging lithium batteries.

Further, it was found that even though the same or substantially the same amount of carbon is contained in the alloy (Examples 4, 8, and 9), the lithium battery, in which silicon-based alloy contains more carbon on a surface thereof, have more improved lifespan characteristics. This may be because of an increase of electrical conductivity due to carbon on the surface of the alloy.

In addition, when comparing the silicon-based alloys prepared in Examples 14 to 16, in which the alloys contain oxygen atoms thereinside, to the silicon-based alloy prepared in Example 6, porosities are lower and CRRs are the same or higher. Therefore, it was found that when silicon-based alloy additionally contains oxygen atoms thereinside, a lithium secondary battery using a negative electrode containing the silicon-based alloy has improved lifespan characteristics.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims, and equivalents thereof.

What is claimed is:

1. A negative active material comprising a porous silicon-based alloy,
    wherein the porous silicon-based alloy comprises silicon (Si); a first metal ($M_1$); and an additional element (A);
    the first metal ($M_1$) is selected from titanium (Ti), vanadium (V), chromium (Cr), iron (Fe), cobalt (Co), nickel (Ni), copper (Cu), zinc (Zn), gallium (Ga), and germanium (Ge);
    the additional element (A) is at least one selected from carbon (C), boron (B), sodium (Na), nitrogen (N), phosphorous (P), sulfur (S), and chlorine (Cl);
    the additional element (A) is inside the porous silicon-based alloy and on surfaces of the porous silicon-based alloy; and
    an internal porosity of the silicon-based alloy is in the range of 24% to 35%, wherein the porosity is determined by Mathematical Equation 1:

Mathematical Equation 1

$$\text{Internal porosity of the silicon-based alloy (\%)} = \left[1 - \frac{\text{density of the alloy measured under a pressure of 20 kN}}{\text{true density of the alloy}}\right] \times 100.$$

2. The negative active material of claim 1, wherein the silicon-based alloy comprises:

a matrix comprising the Si and the first metal ($M_1$);
silicon nanoparticles; and
the additional element (A),
wherein the silicon nanoparticles are dispersed in the matrix, and the additional element (A) is comprised in the matrix and disposed on a surface of the silicon-based alloy.

3. The negative active material of claim 2, wherein the matrix comprises a compound phase comprising Si and the first metal ($M_1$) and the silicon nanoparticles comprise a single phase of Si.

4. The negative active material of claim 2, wherein at least a portion of the additional element (A) of the matrix is in the form of a silicide.

5. The negative active material of claim 1, wherein the first metal ($M_1$) is Fe.

6. The negative active material of claim 1, wherein the silicon-based alloy further comprises an oxygen (O) atom.

7. The negative active material of claim 6, wherein the silicon-based alloy comprises:
a matrix comprising Si, the first metal ($M_1$), and the O atom;
silicon nanoparticles; and
the additional element (A),
wherein the silicon nanoparticles are dispersed in the matrix, and the additional element (A) is in the matrix and on a surface of the silicon-based alloy.

8. The negative active material of claim 7, wherein the matrix comprises a compound phase comprising Si and the first metal ($M_1$) and a compound phase comprising Si and the O atom, and
wherein the silicon nanoparticles comprise a single phase of Si.

9. The negative active material of claim 8, wherein the matrix further comprises a compound phase comprising the first metal ($M_1$) and the O atom.

10. The negative active material of claim 1, wherein the silicon-based powder alloy further comprises a second metal ($M_2$) selected from manganese (Mn), yttrium (Y), zirconium (Zr), niobium (Nb), molybdenum (Mo), silver (Ag), tin (Sn), tantalum (Ta), and tungsten (W).

11. The negative active material of claim 1,
wherein the silicon-based alloy is represented by Si-$M_1$-$M_2$-A, and the second metal ($M_2$) is selected from Mn, Y, Zr, Nb, Mo, Ag, Sn, Ta, and W,
wherein in the silicon-based alloy,
an amount of Si is in a range of about 50 atom % to about 90 atom %, an amount of the first metal ($M_1$) is in a range of about 10 atom % to about 50 atom %, and an amount of $M_2$ is in a range of about 0 atom % to about 10 atom %, based on a total number of atoms of Si, the first metal ($M_1$), and the second metal ($M_2$), and
a total amount of the additional element (A) is in a range of about 0.01 part by weight to about 20 parts by weight, based on 100 parts by weight of a total amount of the Si, the first metal ($M_1$), and the second metal ($M_2$),
wherein the total amount of the additional element (A) is a sum of an amount of the additional element (A) in the silicon-based alloy and an amount of the additional element (A) on the surfaces of the silicon-based alloy.

12. The negative active material of claim 11, wherein the total amount of the additional element (A) is in a range of about 1 part by weight to about 9 parts by weight, based on 100 parts by weight of the total amount of the Si, the first metal ($M_1$), and the second metal ($M_2$).

13. The negative active material of claim 11, wherein the amount of the additional element (A) on the surfaces of the silicon-based alloy is equal to or more than the amount of the additional element (A) in the silicon-based alloy.

14. The negative active material of claim 11, wherein:
the amount of the additional element (A) in the silicon-based alloy is in a range of about 0.1 part by weight to about 4 parts by weight, based on 100 parts by weight of the total amount of the Si, the first metal ($M_1$), and the second metal ($M_2$), and
the amount of the additional element (A) on the surfaces of the silicon-based alloy is in a range of about 0.5 part by weight to about 7 parts by weight, based on 100 parts by weight of the total amount of the Si, the first metal ($M_1$), and the second metal ($M_2$).

15. The negative active material of claim 1,
wherein the silicon-based alloy is represented by Si-$M_1$-$M_2$-A-O, and the second metal ($M_2$) is selected from Mn, Y, Zr, Nb, Mo, Ag, Sn, Ta, and W,
wherein in the silicon-based alloy,
an amount of Si is in a range of about 50 atom % to about 90 atom %, an amount of the first metal ($M_1$) is in a range of about 10 atom % to about 50 atom %, and an amount of the second metal ($M_2$) is in a range of about 0 atom % to about 10 atom %, based on a total number of atoms of the Si, the first metal ($M_1$), and the second metal ($M_2$), and
a total amount of the additional element (A) is in a range of about 0.01 part by weight to about 20 parts by weight, an amount of O is in a range of about 0.01 part by weight to 50 parts by weight, based on 100 parts by weight of a total weight of the Si, the first metal ($M_1$), and the second metal ($M_2$).

16. The negative active material of claim 15, wherein the silicon-based alloy comprises:
a matrix comprising Si, the first metal ($M_1$), the second metal ($M_2$), and O;
silicon nanoparticles; and
the additional element (A),
wherein the silicon nanoparticles are dispersed in the matrix,
the additional element (A) is in the matrix and on a surface of the silicon-based alloy,
the matrix comprises a compound phase comprising Si and the first metal ($M_1$), a compound phase comprising Si and the second metal ($M_2$), and a compound phase comprising Si and O, and
the silicon nanoparticles comprise a single phase of Si.

17. The negative active material of claim 1,
wherein the silicon-based alloy is represented by Si-$M_1$-$M_2$-C—B—O, and the second metal ($M_2$) is selected from Mn, Y, Zr, Nb, Mo, Ag, Sn, Ta, and W,
wherein in the silicon-based alloy,
an amount of Si is in a range of about 50 atom % to about 90 atom %, an amount of the first metal ($M_1$) is in a range of about 10 atom % to about 50 atom %, and an amount of the second metal ($M_2$) is in a range of about 0 atom % to about 10 atom %, based on a total number of atoms of Si, the first metal ($M_1$), and the second metal ($M_2$), and
a total amount of C is in a range of about 0.01 part by weight to about 20 parts by weight, a total amount of B is in a range of about 0 part by weight to about 20 parts by weight, and an amount of O is in a range of about 0.01 part by weight to about 50 parts by weight, based on 100 parts by weight of a total weight of Si, the first metal ($M_1$), and the second metal ($M_2$).

18. The negative active material of claim 1, wherein an average particle diameter (D50) of the silicon-based alloy is in a range of about 1 μm to about 5 μm.

19. The negative active material of claim 2, wherein the silicon-based alloy comprises silicon nanoparticles, and a D50 of the silicon nanoparticles is in a range of about 10 nm to about 150 nm.

20. A lithium battery including a negative active material according to claim 1.

* * * * *